(12) United States Patent
Kashimoto

(10) Patent No.: US 10,557,241 B2
(45) Date of Patent: Feb. 11, 2020

(54) PILING CONSTRUCTION MANAGEMENT METHOD

(71) Applicant: Oak Co., Ltd, Hyogo (JP)

(72) Inventor: Takahiko Kashimoto, Hyogo (JP)

(73) Assignee: Oak Co., Ltd. (JP)

( * ) Notice: Subject to any disclaimer, the term of this patent is extended or adjusted under 35 U.S.C. 154(b) by 287 days.

(21) Appl. No.: 15/715,782

(22) Filed: Sep. 26, 2017

(65) Prior Publication Data

US 2018/0016763 A1  Jan. 18, 2018

Related U.S. Application Data

(63) Continuation of application No. PCT/JP2016/083919, filed on Nov. 16, 2016.

(30) Foreign Application Priority Data

| Dec. 25, 2015 | (JP) | 2015-254925 |
| Mar. 10, 2016 | (JP) | 2016-047296 |
| Mar. 31, 2016 | (JP) | 2016-071845 |
| Apr. 8, 2016 | (JP) | 2016-078302 |
| Jun. 16, 2016 | (JP) | 2016-120081 |

(51) Int. Cl.
*E02D 1/02* (2006.01)
*E02D 1/00* (2006.01)
(Continued)

(52) U.S. Cl.
CPC .............. *E02D 1/022* (2013.01); *E02D 1/02* (2013.01); *E02D 5/24* (2013.01); *E02D 5/34* (2013.01);
(Continued)

(58) Field of Classification Search
CPC .. E02D 1/00; E02D 1/02; E02D 1/022; E02D 7/08; E02D 7/10; E02D 13/06; E21B 49/00
See application file for complete search history.

(56) References Cited

U.S. PATENT DOCUMENTS 4,770,030 A * 9/1988 Smith ..................... E21B 25/00
73/84
4,993,500 A * 2/1991 Greene ................... E02D 1/025
173/1
(Continued)

FOREIGN PATENT DOCUMENTS

JP     S5748019 A    3/1982
JP     61151307 A *  7/1986 ............. E02D 13/06
(Continued)

*Primary Examiner* — Benjamin F Fiorello
*Assistant Examiner* — Stacy N Lawson
(74) *Attorney, Agent, or Firm* — St. Onge Steward Johnston & Reens LLC

(57) ABSTRACT

In a piling construction management method a support strength of a hole bottom is measured with a penetration testing device before erecting a piling in a piling hole. The piling is erected in the piling hole when the measurement is at least a prescribed value. The penetration testing device has a knocking block with an integrated penetration shaft and the block is struck by a drive hammer in free-fall. The penetration testing device determines the support strength from the number of impacts required for the penetration shaft to penetrate to a prescribed depth from the hole bottom.

8 Claims, 16 Drawing Sheets

(51) Int. Cl.
- *G01L 5/00* (2006.01)
- *E02D 13/06* (2006.01)
- *E02D 5/24* (2006.01)
- *E02D 5/34* (2006.01)
- *E02D 7/10* (2006.01)

(52) U.S. Cl.
CPC ............... *E02D 7/10* (2013.01); *E02D 13/06* (2013.01); *G01L 5/0052* (2013.01)

(56) References Cited

U.S. PATENT DOCUMENTS

2003/0024713 A1* 2/2003 Han ................. E02D 1/022 173/89
2004/0065453 A1* 4/2004 Tsai ................. E02D 1/025 173/1
2005/0126821 A1* 6/2005 Davies ................. E21B 3/02 175/20

FOREIGN PATENT DOCUMENTS

| | | | |
|---|---|---|---|
| JP | S61151307 A | | 7/1986 |
| JP | H05280031 A | | 10/1993 |
| JP | 06287944 A | * | 10/1994 |
| JP | H06287944 A | | 10/1994 |
| JP | 2000245058 A | | 9/2000 |
| JP | 2003074045 A | | 3/2003 |
| JP | 2005200962 A | * | 7/2005 |
| JP | 2005200962 A | | 7/2005 |
| JP | 2009057693 A | | 3/2009 |
| JP | 2013112953 A | | 6/2013 |
| JP | 2013122121 A | * | 6/2013 |
| JP | 2013122121 A | | 6/2013 |

* cited by examiner

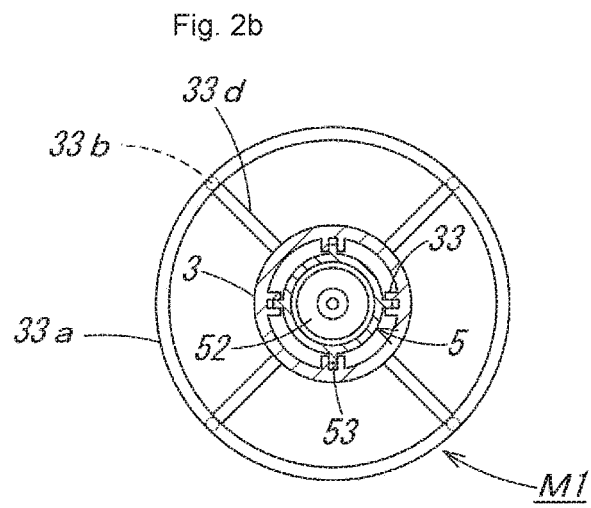
Fig. 2b
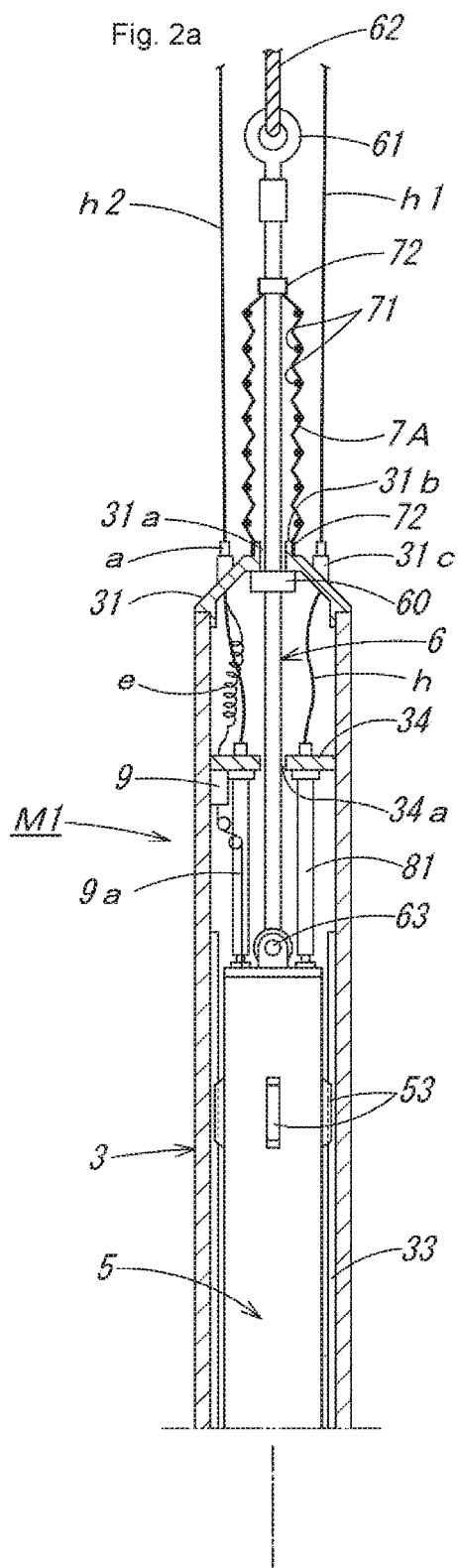
Fig. 2a
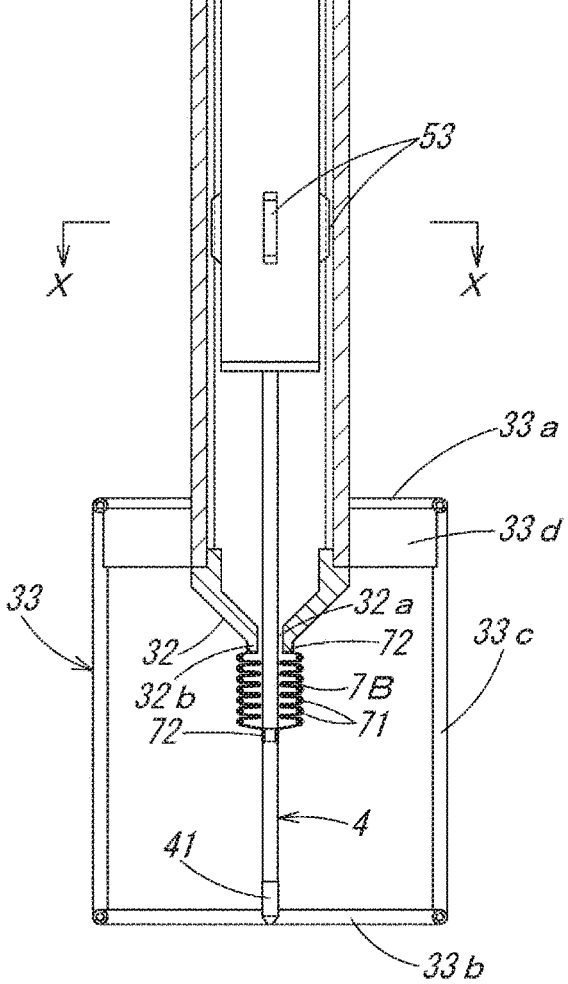

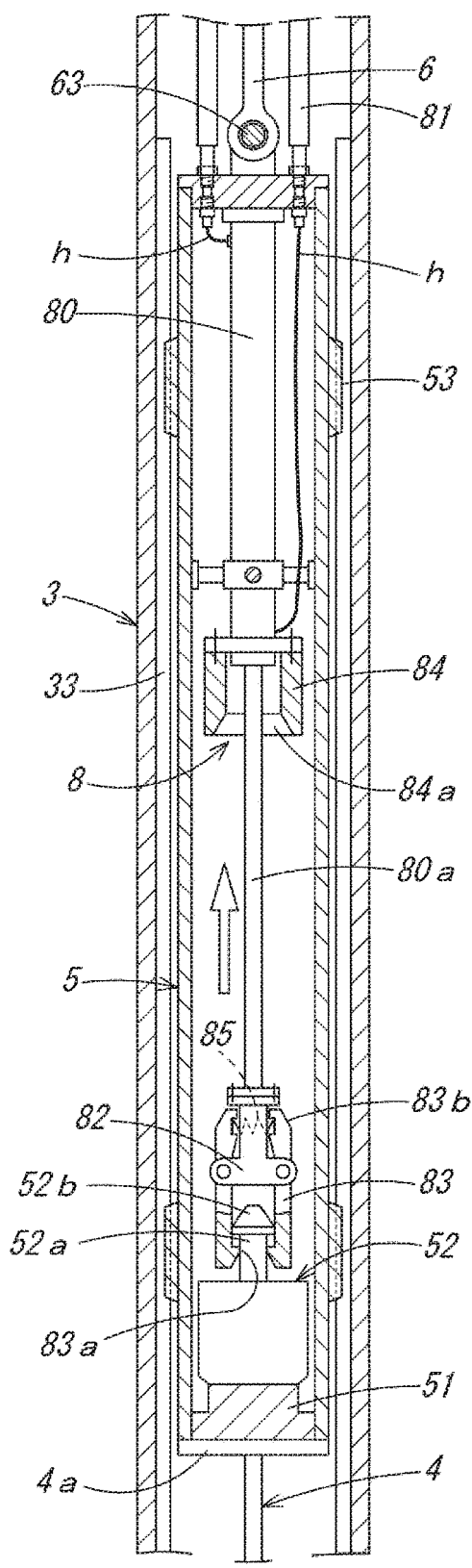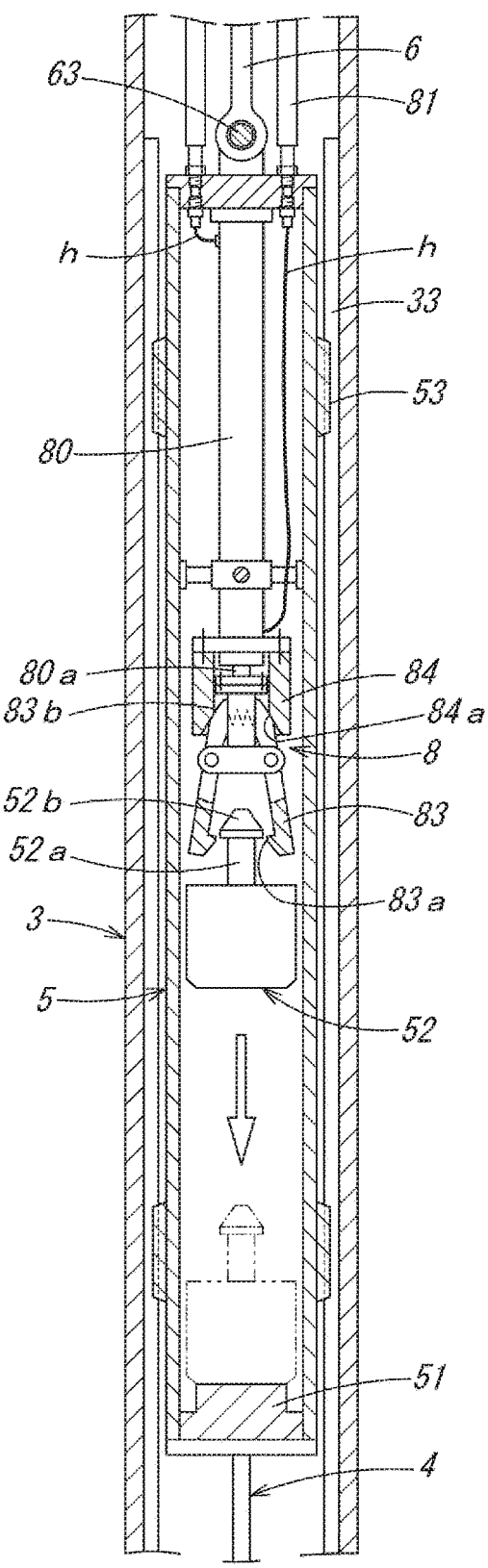

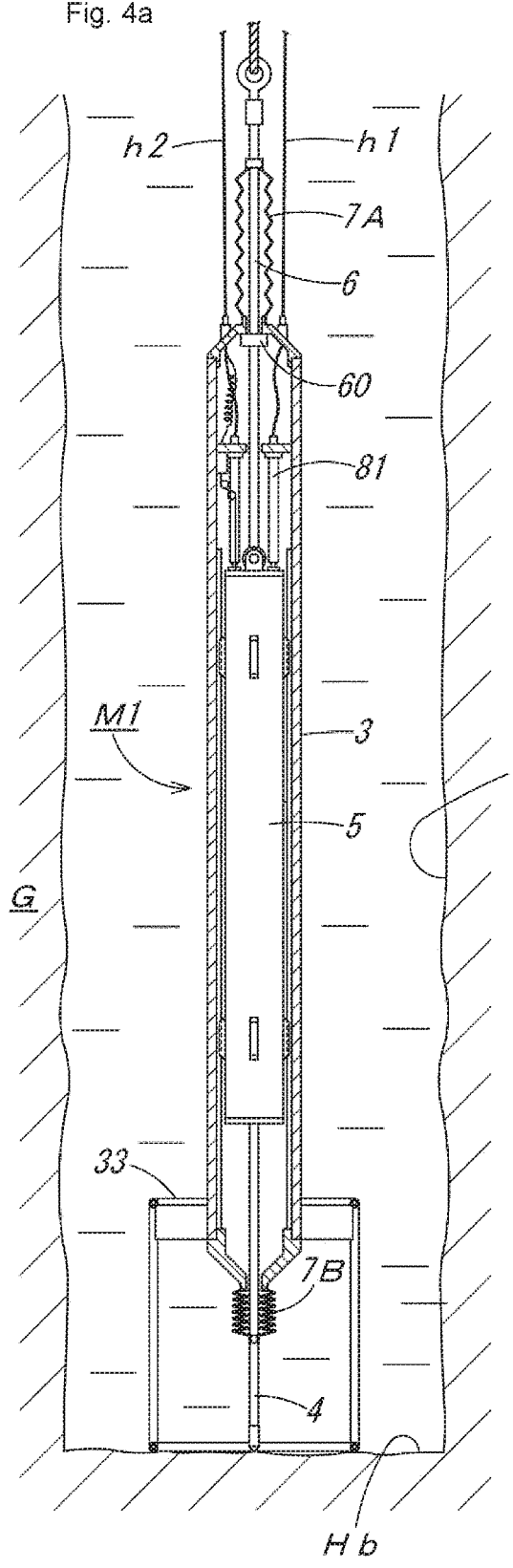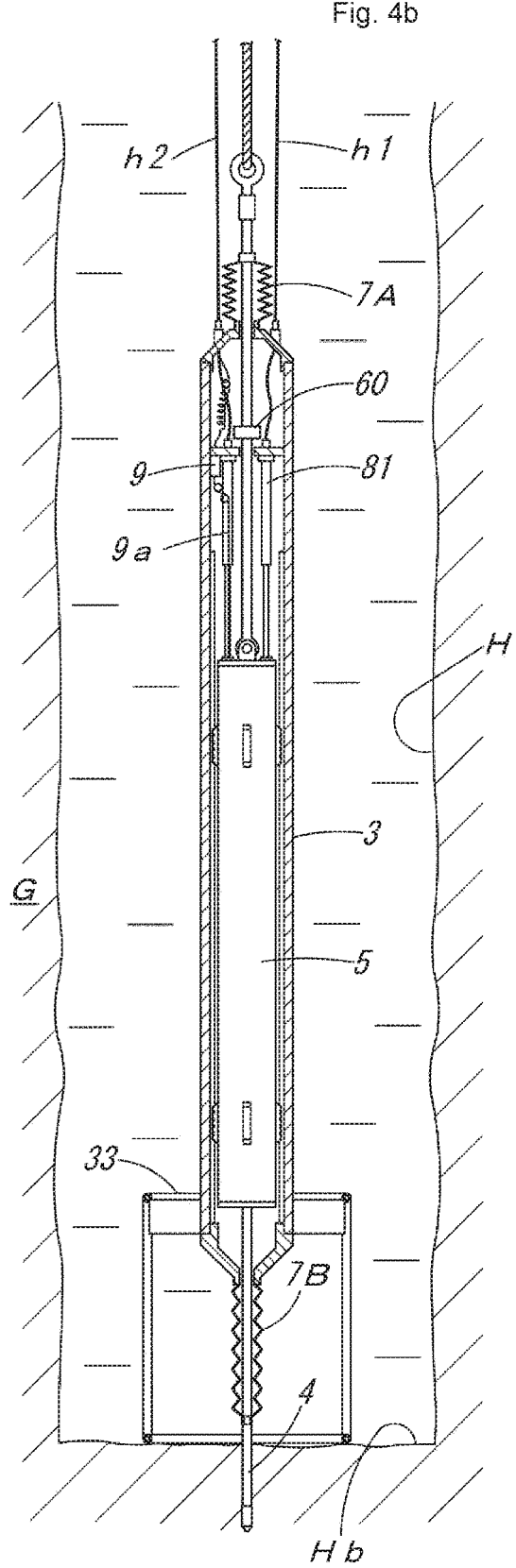

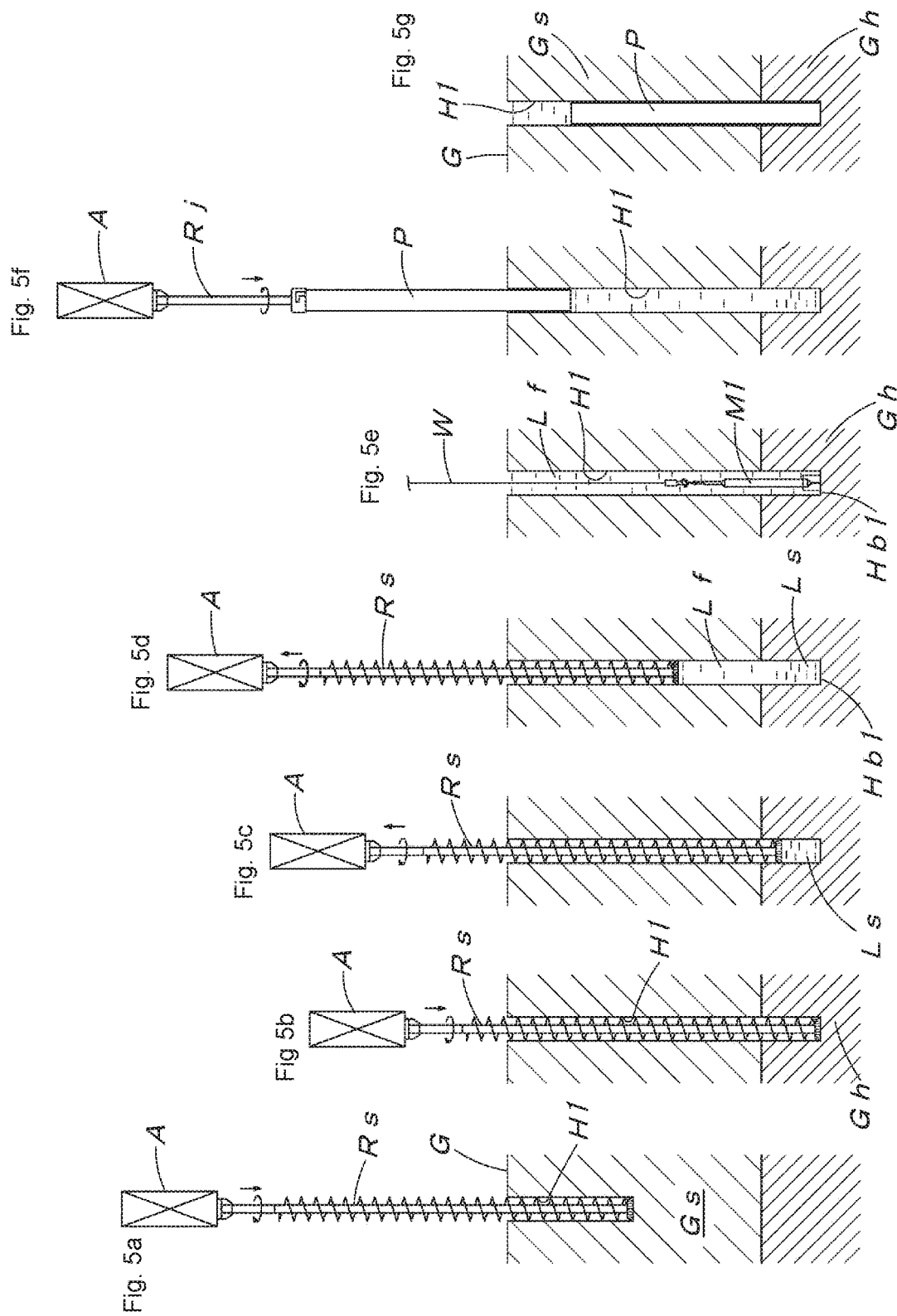

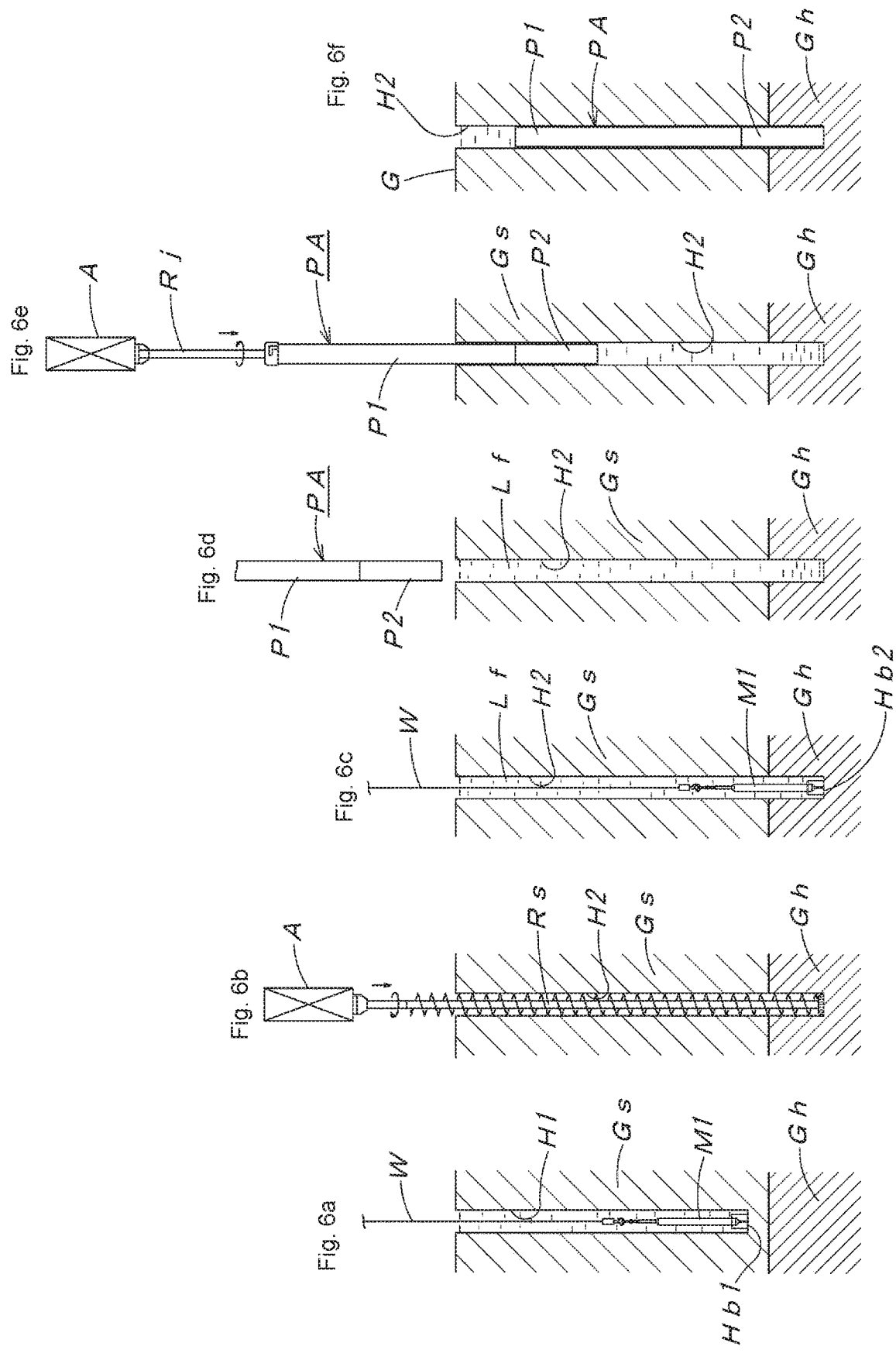

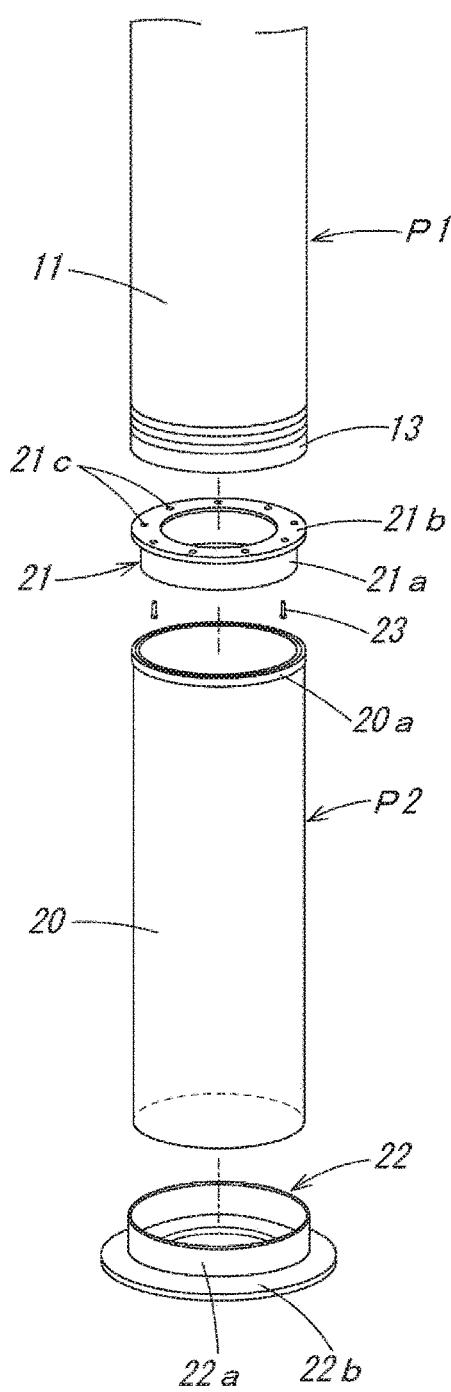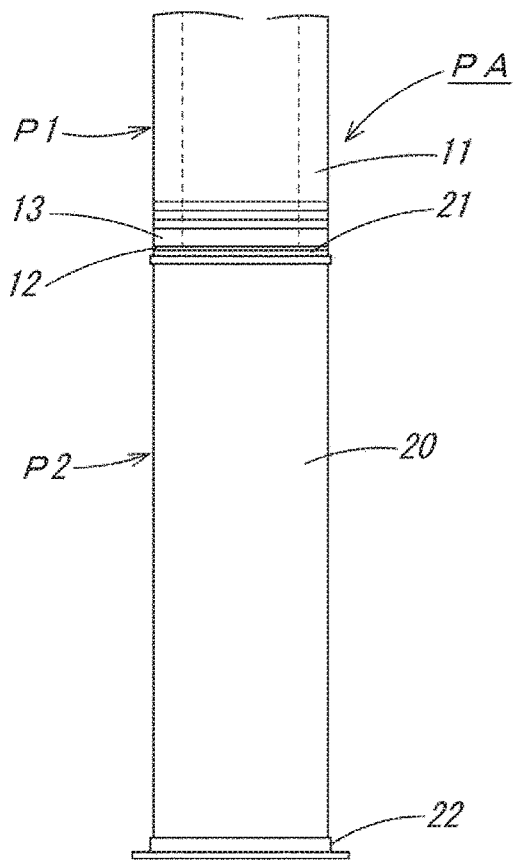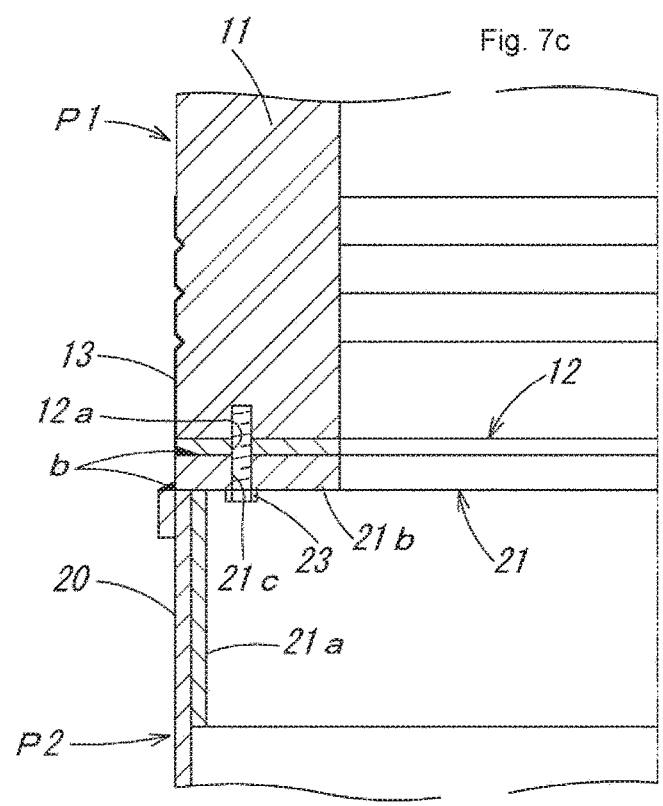

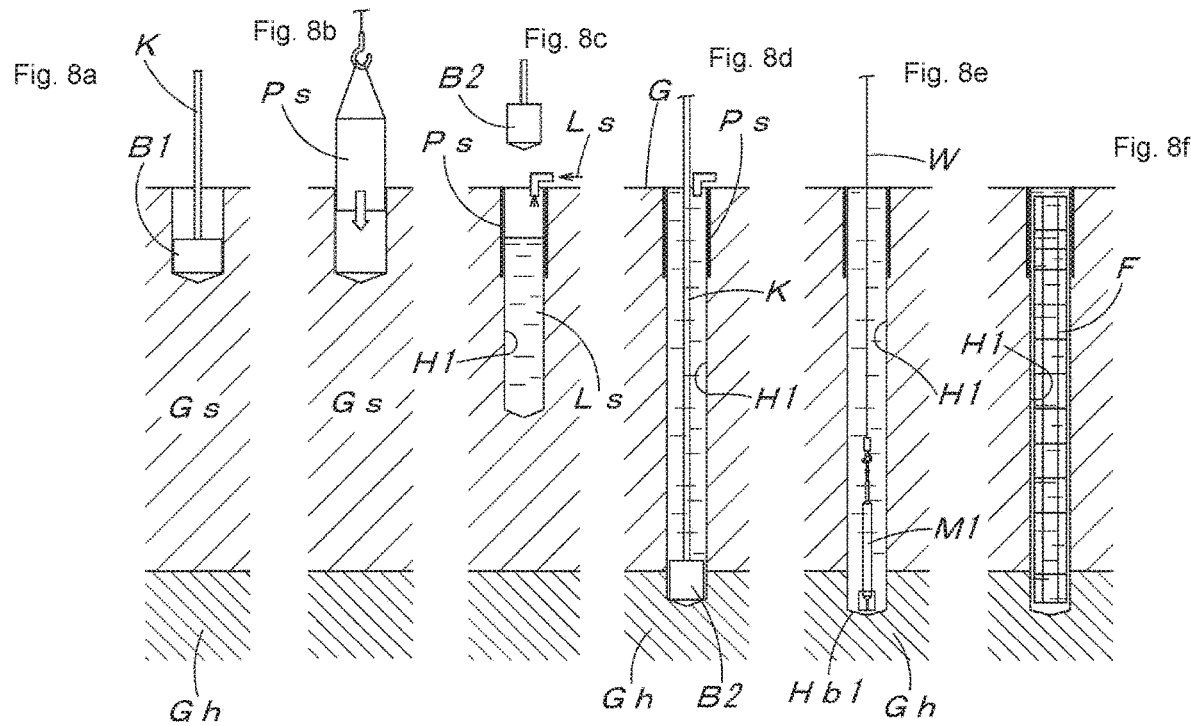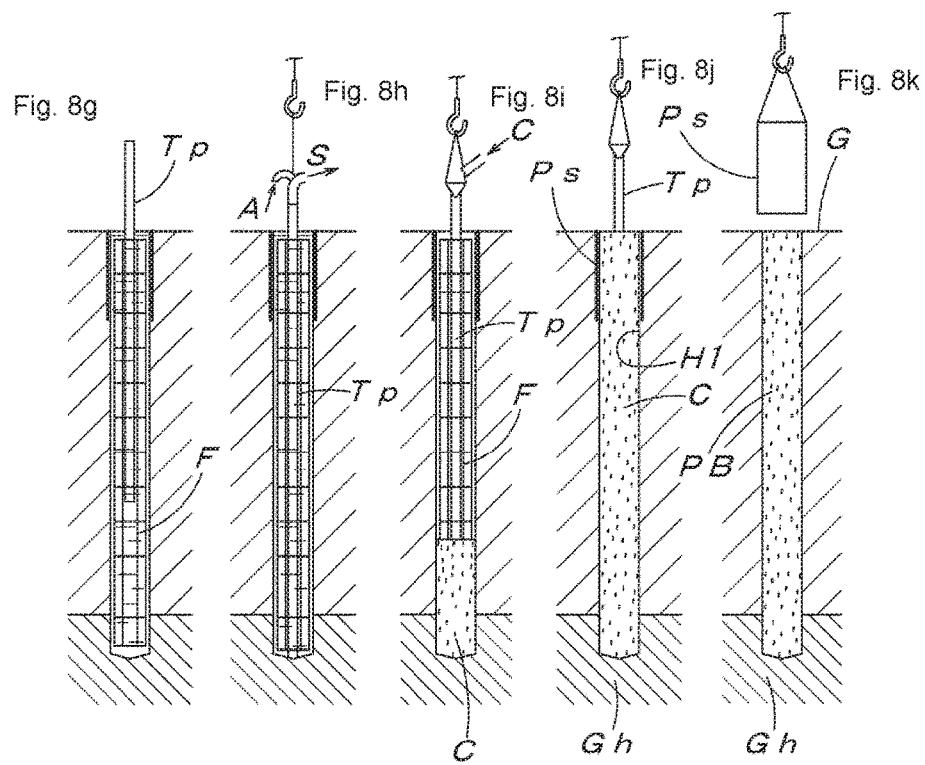

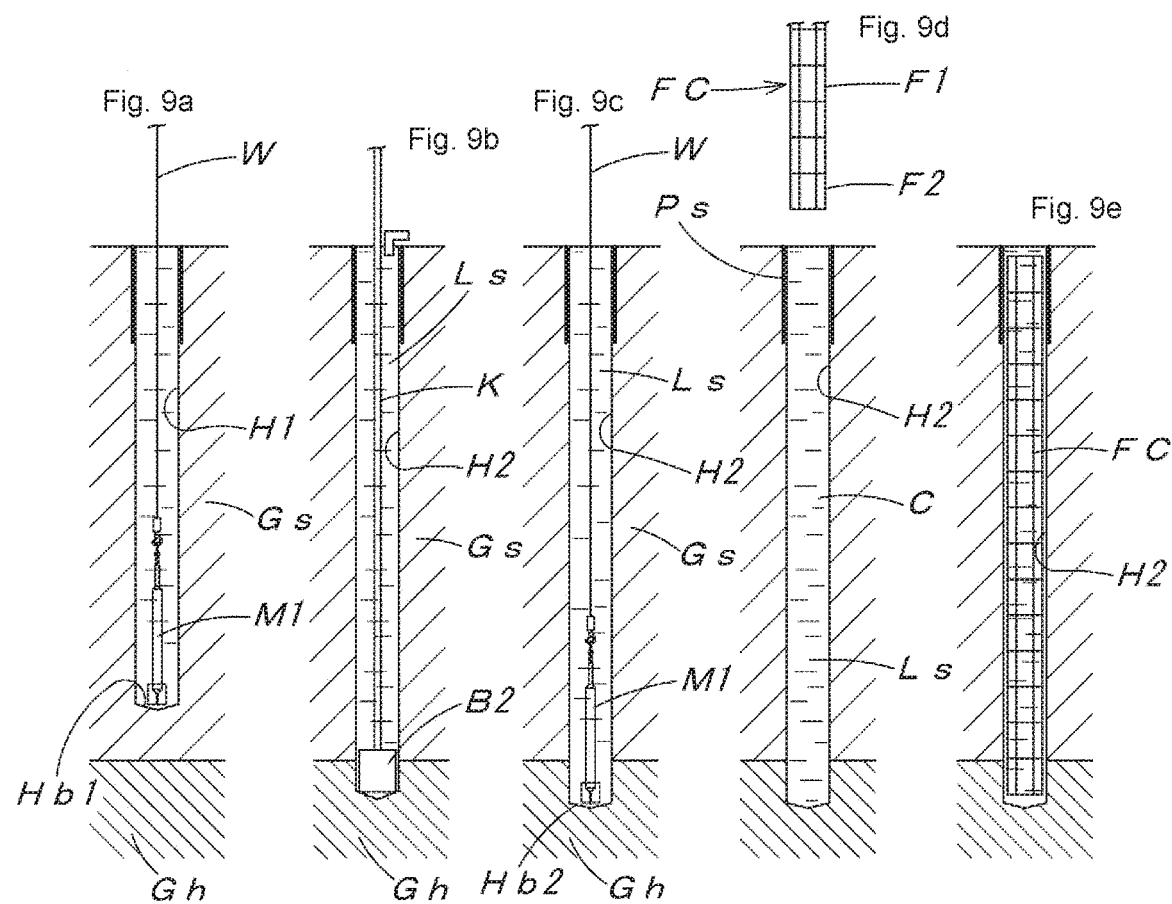

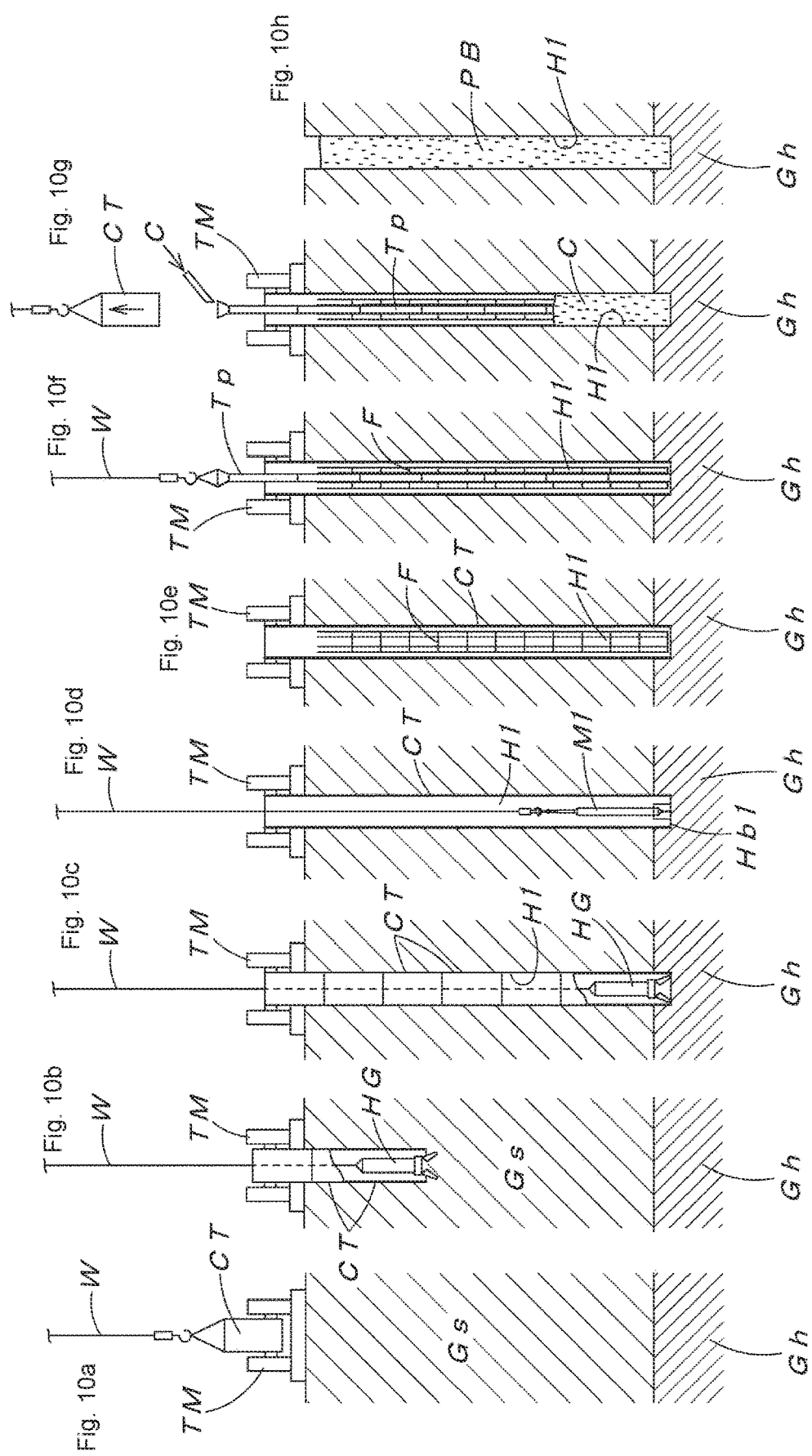

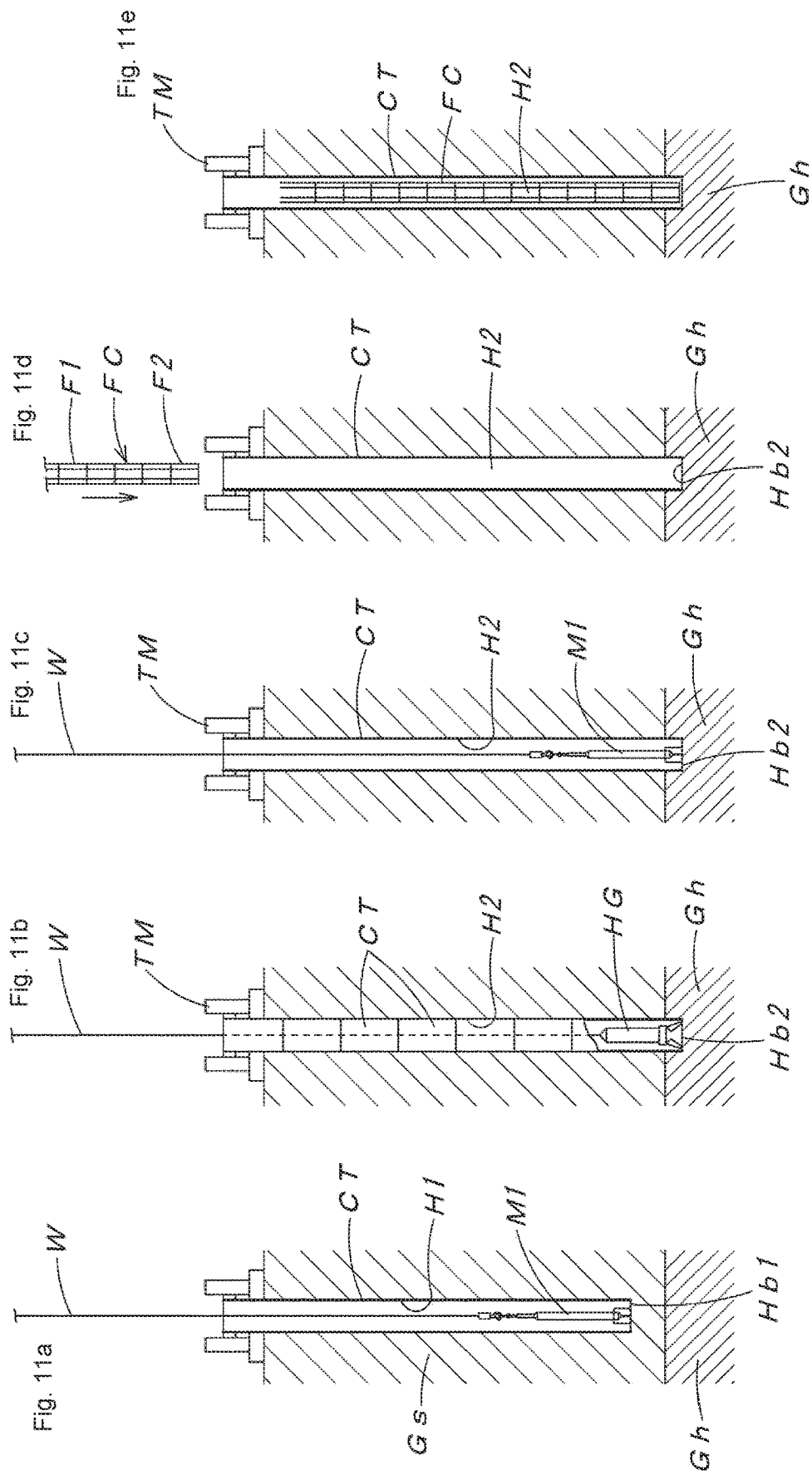

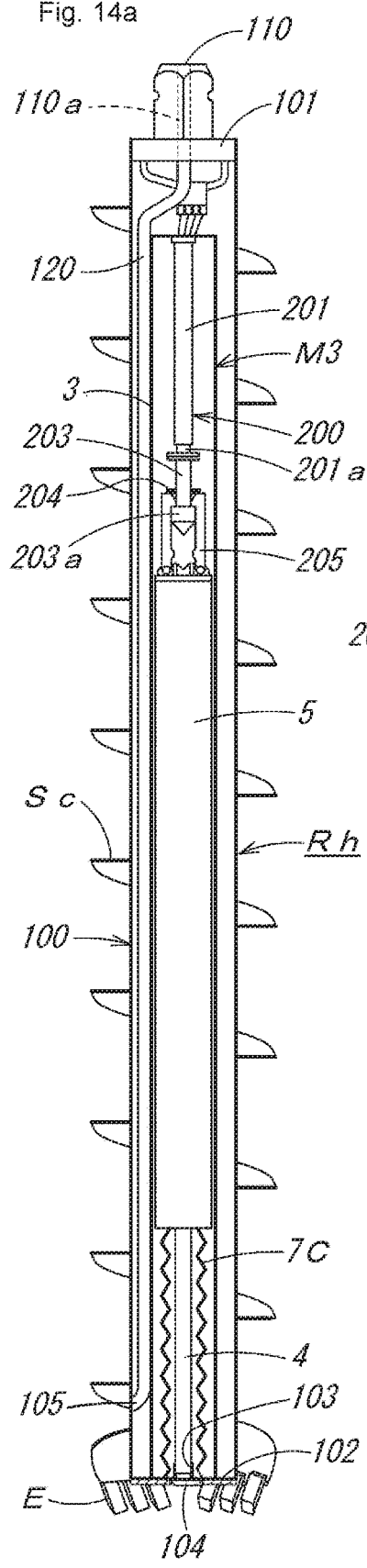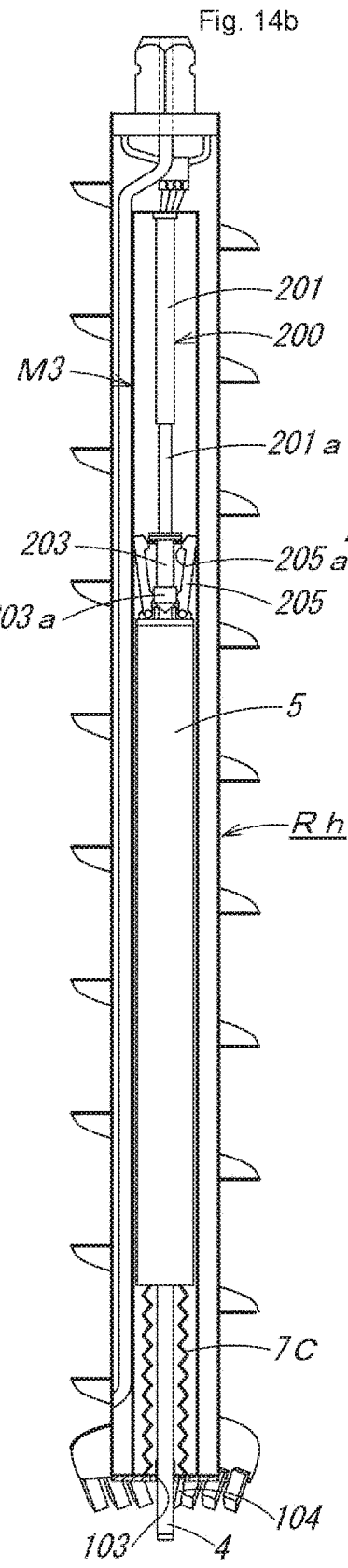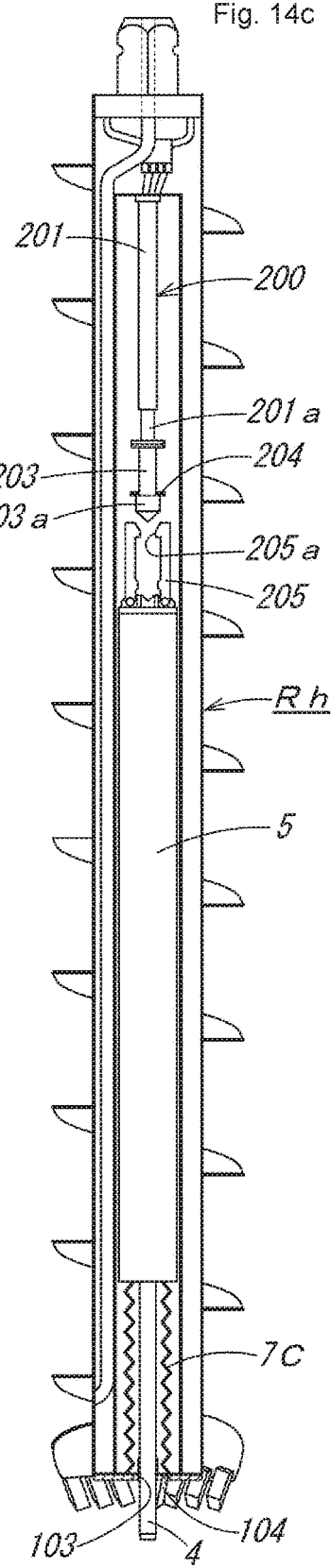

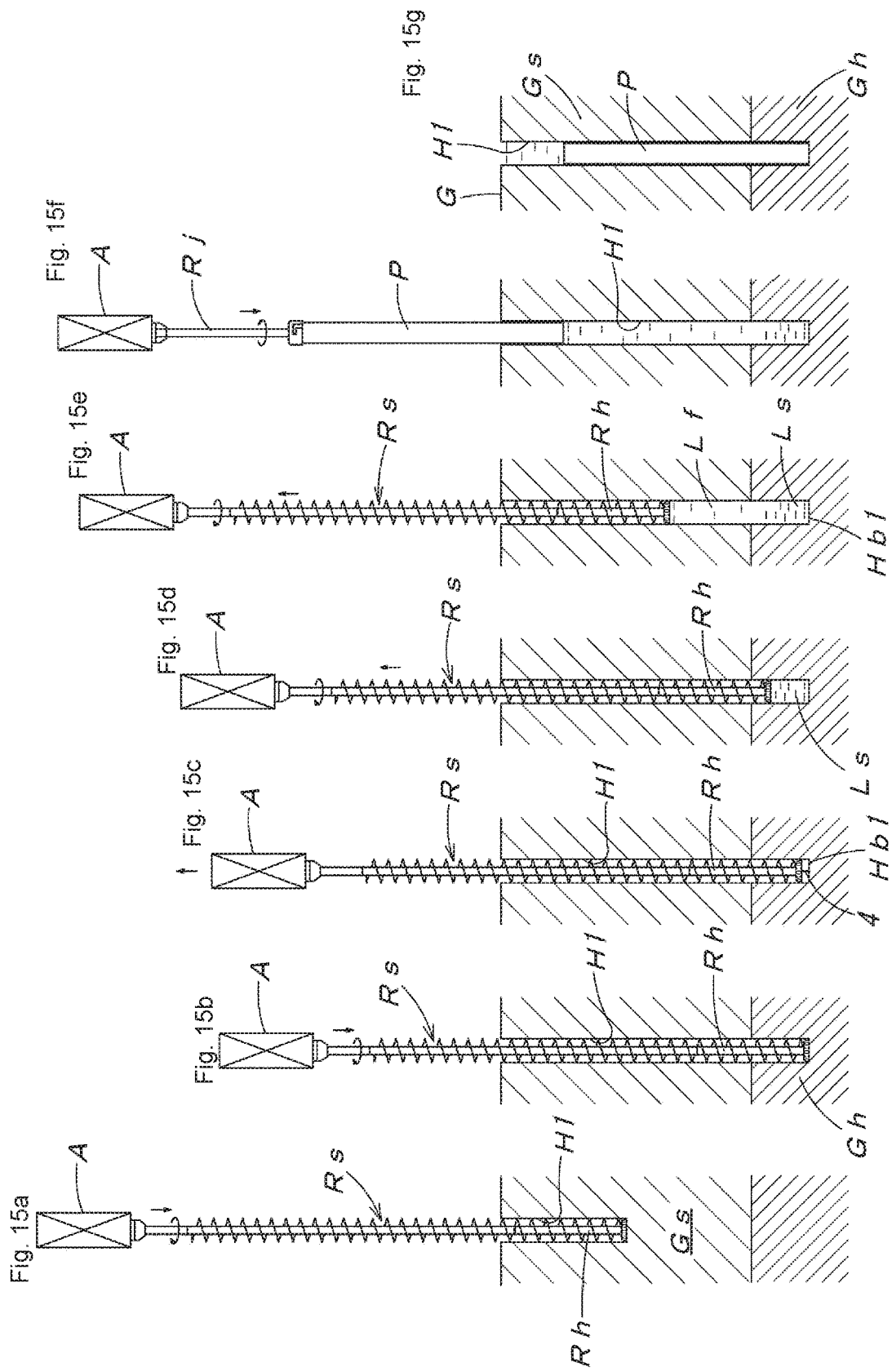

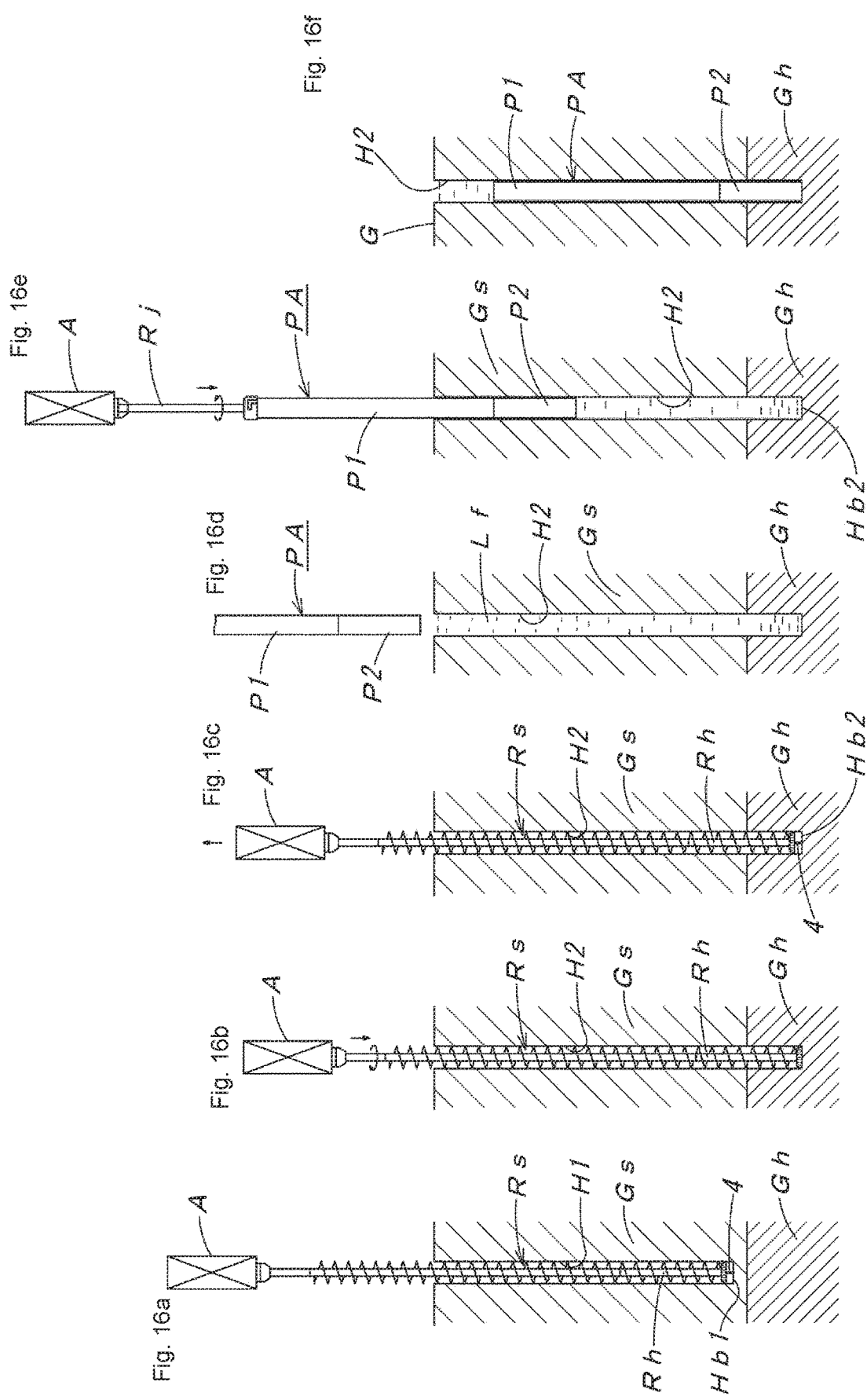

PILING CONSTRUCTION MANAGEMENT METHOD

TECHNICAL FIELD

The present invention relates to a piling construction management method to erect a precast piling or cast-in-place piling in a piling hole bored in the ground by a preboring method, an earth drilling method, and an all casing method, etc.

BACKGROUND ART

Conventionally, in construction of a precast piling by a preboring method, generally, by lowering a screw rod attached to an auger machine that moves up and down along a leader of a three-point pile driver, etc., while driving and rotating the screw rod, the ground is dug and a piling hole is formed to have a depth reaching an estimated bearing stratum of deep underground, and thereafter, while the screw rod is pulled up, a foot protection liquid such as soil cement is injected into the piling hole, and subsequently, a hole circumference fixative solution is injected up to an upper portion of the piling hole, and this screw rod is pulled out, and then a precast piling such as a PHC piling or PRC piling is connected to the auger machine A via a connecting rod, and this precast piling is inserted and embedded in the piling hole.

On the other hand, for construction of a cast-in-place piling, a kelly bar type earth drilling method is widely used. In this construction method, a cast-in-place piling is erected through the process of digging the ground and removing soil by a shaft digging bucket connected to a kelly bar of an earth drill machine, press-fitting a standpipe in the dug hole, and while injecting a slurry such as a bentonite solution into the hole, digging the ground and removing soil by a replaced shaft digging bucket with a small diameter to form a piling hole with a depth reaching an estimated bearing stratum of deep underground, and inserting, in this piling hole, a reinforced frame and a tremie pipe, and after discharging slime by air introduction, placing concrete and pulling out the tremie pipe and the standpipe. It is noted that, as belled pile construction, a cast-in-place piling is often erected after a bottom portion of a piling hole is enlarged by a belling bucket. As other cast-in-place piling construction methods, there are also known methods such as an all casing method in which after a casing is pressed into the ground while being repeatedly rotated, soil inside is dug with a hammer grab, and after a reinforced frame is inserted into a hole, concrete is placed while the casing is pulled out, and a reverse construction method in which the ground is dug by rotating a drill bit, and a hole is bored by discharging dug soil onto the ground together with water inside the hole, a hole wall is protected by circulating, inside the hole, water separated from soil, and a reinforced frame is erected inside the hole and concrete is placed.

Generally, whether or not a piling support force after completion of erection by these construction methods is sufficient can be determined by a load carrying test, however, when insufficient support strength is found by this test, large amounts of labor, time, and cost are needed for redoing piling construction, it is therefore ideal if it can be determined whether or not a support force of a dug piling hole is sufficient for a pile distal end before erecting the piling. Conventionally, from such a viewpoint, a method has been proposed in which a change in digging load is detected from a current value of a rotary drive motor of a digging member, reaching a piling hole to a hard bearing stratum of deep underground is confirmed based on an increase in digging load (Japanese Published Unexamined Patent Application No. H5-280031, Japanese Published Unexamined Patent Application No. 2000-245058 and Japanese Published Unexamined Patent Application No. 2003-74045).

However, in the method in which a change in digging load is detected from a current value of a rotary drive motor, as a dug hole becomes deeper, as frictional resistance between the digging member and the hole wall increases, the digging load significantly increases even when the hole does not reach a bearing stratum, and to the contrary, due to slippage occurring at a digging portion, the digging load decreases although the hole has reached a bearing stratum, and further, the digging load greatly fluctuates depending on an operator's digging operation skill, therefore, the change in digging load is poor in reliability as an index of confirmation of reach to a bearing stratum. Therefore, generally, exclusively based on data of a geological sample obtained through pilot boring at a planned construction site, digging to a prescribed depth is usually regarded as reaching a bearing stratum, however, the deep underground of the entire planned construction site is not always uniform in stratigraphic succession and homogeneous, and depending on geological history, there are many cases where the depth of the bearing stratum locally differs or the hardness of the bearing stratum greatly differs, therefore, it cannot be said that bottom portions of individual piling holes do not have sufficient support forces for piling distal ends in actuality.

SUMMARY OF INVENTION

In view of the circumstances described above, an object of the present invention is to provide a piling construction management method that allows elimination of the effort of redoing piling construction due to insufficient support strength by making it possible to very easily and reliably determine whether or not a support force of a piling hole is sufficient for a distal end of a piling before erecting a cast-in-place piling or a precast piling in the piling hole bored in advance in the ground as in the case of an earth drilling method and a preboring method.

Showing a means to attain the above-described object with reference signs in the drawings, in a piling construction management method according to an embodiment of the invention, after forming a piling hole H1 with a set depth in the ground G, before erecting a piling in the piling hole H1, by using a penetration testing device M1, M2, or M3 including a knocking block 51 integrated with a penetration shaft 4 that projects downward, a drive hammer 52 that strikes the knocking block 51 in free-fall, and a lifting mechanism 8 that lifts the drive hammer 52 after falling and releases the same at a prescribed height, the penetration shaft 4 of the penetration testing device M1, M2, or M3 disposed inside the piling hole H1 is made to reach a hole bottom Hb1, and from the number of impacts by the drive hammer 52 required for the penetration shaft 4 to penetrate to a prescribed depth from the hole bottom Hb1, a support strength of the hole bottom Hb1 is determined, and when the support strength is equal to or more than a prescribed value, a piling is erected in the piling hole H1, and on the other hand, when the support strength is less than the prescribed value, the piling hole H1 is dug again to be deeper, a support strength of a hole bottom Hb2 after being dug again is determined in the same manner with the penetration testing device M1, M2, or M3, and when the support strength reaches the prescribed value or more, a piling with a length corresponding to a depth of a piling hole H2 after being dug again is erected in the piling hole H2.

According to an embodiment of the invention, in the above-described piling construction management methods, each of the penetration testing devices M1 to M3 is configured such that a cylindrical hammer casing 5 incorporating the lifting mechanism 8 and the drive hammer 52 is held movably up and down inside a vertical cylindrical outer casing 3, the knocking block 51 is fixed to a lower end of the hammer casing 5, and the penetration shaft 4 penetrates through a lower end side of the outer casing 3 and projects downward to the outside.

According to an embodiment of the invention in the above-described piling construction management methods, each of the penetration testing devices M1 to M3 incorporates an encoder 9 that measures a sinkage amount of the hammer casing 5.

According to an embodiment of the invention in the above-described piling construction management methods, it is configured such that the penetration testing device M1 is of a suspended type, and the penetration testing device M1 is suspended by a wire W of a crane and let into and out of the piling hole H1 or H2.

According to an embodiment of the invention, in the above-described piling construction management methods, it is configured such that the penetration testing device M2 is of a digging rod connecting type, and the penetration testing device M2 is connected in place of a digging tip member (a tip end rod member Rh, a shaft digging bucket B2, a belling bucket B3) after digging the piling hole H1 or H2, and let into and out of the piling hole.

According to an embodiment of the invention, in the above-described piling construction management methods, it is configured such that the penetration testing device M3 is of a type incorporating a hollow rod of the digging tip member (a tip end rod member Rh, a shaft digging bucket B2, a belling bucket B3), and a penetration test is conducted by activating the penetration testing device M3 in a state where the digging tip member is inserted in the piling hole H1 or H2 after being dug.

According to an embodiment of the invention, in the above-described piling construction management methods, it is characterized in that a piling to be erected is a precast piling, and when erecting the piling in the piling hole H2 after being dug again, a short piling member P2 corresponding to an increase in depth caused by re-digging is added and connected to a piling main body P1 with a length corresponding to the piling hole H1 that was formed first, and a piling PA thus connected is erected in the piling hole H2 after being dug again.

According to an embodiment of the invention, in the above-described piling construction management methods, it is configured such that the piling main body P1 is a concrete piling, and to a lower end thereof, a steel pipe piling as the short piling member P2 is added and connected.

According to an embodiment of the invention, in the above-described piling construction management methods, it is characterized in that a piling to be erected is a cast-in-place piling using a reinforced frame, and when erecting the piling in the piling hole H2 after being dug again, a frame extension portion F2 with a length corresponding to an increase in depth caused by re-digging is added and assembled to a reinforced frame main body F1 with a length corresponding to the piling hole H1 that was formed first, and a reinforced frame FC thus extended is inserted in the piling hole H2 after being dug again and fresh concrete C is placed therein to form a cast-in-place piling PB.

Next, effects of the present invention are described with the reference signs in the drawings. First, in the piling construction management method according to an embodiment of the invention, after forming a piling hole H1 with a set depth in the ground G, before erecting a piling in the piling hole H1, a penetration shaft 4 of a specific penetration testing device M1, M2, or M3 disposed inside the piling hole H1 is made to reach a hole bottom Hb1 to determine a support strength of the hole bottom Hb1. This support strength can be very easily and reliably measured as an actual measured value (N value) from the number of impacts by the drive hammer 2 required for the penetration shaft 4 to penetrate to a prescribed depth from the hole bottom Hb1. Then, when the support strength is equal to or more than a prescribed value, erection is determined to be possible, and piling construction can be efficiently completed by erecting a piling in the piling hole H1.

On the other hand, when the support strength is less than the prescribed value, erection is not possible, therefore, it suffices that, the piling hole H1 is dug again to be deeper, a support strength of a hole bottom Hb2 after being dug again is determined in the same manner with the penetration testing device M1, M2, or M3, and when the support strength reaches the prescribed value or more, a piling with a length corresponding to a depth of the piling hole H2 dug again is erected in the piling hole H2. Therefore, even if the support strength of the hole bottom Hb1 of the piling hole H1 with a set depth dug first is insufficient, there is no need to form a new piling hole at a different place, and it is possible to respond by digging the same hole H1 again and performing determination again, therefore, a change in design of a building, a significant increase in construction cost, and extension of construction period, etc., can be avoided.

According to an embodiment of the invention, in each of the penetration testing devices M1 to M3, the hammer casing 5 held movably up and down inside the vertical cylindrical casing 3 incorporates the lifting mechanism 8 and the drive hammer 52, and to a lower end of the hammer casing 5, the knocking block 51 is fixed, and the penetration shaft 4 is accordingly integrated with the hammer casing 5, therefore, falling movement of the drive hammer 52 and accompanying penetrating movement of the penetration shaft 4 into the hole bottom ground are stably and reliably performed.

According to an embodiment of the invention, each of the penetration testing devices M1 to M3 incorporates an encoder 9 that measures a sinkage amount of the hammer casing 5, therefore, a penetration amount into the hole bottom Hb1 or Hb2 according to striking by the knocking block 51 can be accurately detected.

According to an embodiment of the invention, the penetration testing device M1 is of a suspended type, there are therefore advantages that the penetration testing device M1 can be suspended by a wire W of a crane and efficiently let into and out of the piling hole H1 or H2, and the penetration testing device M1 can be easily manufactured.

According to an embodiment of the invention, the penetration testing device M2 is of a digging rod connecting type, there are therefore advantages that a screw rod Rs of an earth auger AA or a kelly bar K of an earth drill machine AD, etc., used to dig the piling hole H1 or H2, is used, and in place of a digging tip member (a tip end rod member Rh, a shaft digging bucket B2, a belling bucket B3) thereof, the penetration testing device M2 is connected, and accordingly, the penetration testing device M2 can be efficiently let into and out of the piling hole H1 or H2, and the penetration testing device M2 can be easily manufactured.

According to an embodiment of the invention, the penetration testing device M3 is of a type incorporating a hollow rod of a digging tip member, therefore, without pulling out a digging tip member that dug the piling hole H1 or H2, for example, a tip end rod member Rh of an earth auger AA or a shaft digging bucket B2 or belling bucket B3 connected to a kelly bar K of an earth drill machine AD, etc., from the piling hole H1 or H2, determination of support strengths of the hole bottoms Hb1 and Hb2 can be subsequently performed by a penetration test, and accordingly, work efficiency is significantly improved even with a penetration test step is put in the middle of piling construction.

According to an embodiment of the invention, when erecting a precast piling in the piling hole H2 after being dug again, a piling PA obtained by adding and connecting a short piling member P2 corresponding to an increase in depth caused by re-digging to a piling main body P1 with a length corresponding to the piling hole H1 that was formed first, is used, therefore, by making a digging depth of re-digging correspond to a length of the short piling member P2, uniform piling construction management can be performed by using short piling members P2 having the same dimensions and shape.

According to an embodiment of the invention, as a precast piling to be erected in the piling hole H2 after being dug again, a steel pipe piling 20 as the short piling member P2 is added and connected to a lower end of the piling main body P1 formed of concrete piling, therefore, the work of this addition and connection can be easily and swiftly performed. In addition, as a steel pipe material of the steel pipe piling 20, when a material of length is prepared in advance, a portion with a length corresponding to an increase in depth caused by re-digging of the piling hole H1 can be cut out of this steel pipe material and used as the steel pipe piling 20.

According to an embodiment of the invention, when erecting a cast-in-place piling in the piling hole H2 after being dug again, a frame extension portion F2 is added and assembled to the reinforced frame main body F1 with a length corresponding to the piling hole H1 with a first set depth and used, therefore, it is possible to easily respond to an increase in depth caused by re-digging.

BRIEF DESCRIPTION OF DRAWINGS

FIGS. 2a and 2b show the inside of the penetration testing device, and FIG. 2a is a longitudinal sectional front view, and FIG. 2b is an arrow sectional view taken along the X-X line in FIG. 2a.

FIGS. 3a and 3b show the inside of a hammer casing in the penetration testing device, and FIG. 3a is a longitudinal sectional front view showing a state where a drive hammer at a fallen position is grasped by a clamp portion of a lifting mechanism, and FIG. 3b is a longitudinal sectional front view showing a state where the drive hammer lifted to an upper limit position by the lifting mechanism is released, respectively.

FIGS. 4a and 4b show a penetration testing operation using the penetration testing device, and FIG. 4a is a longitudinal sectional front view showing a state where the penetration testing device is made to reach a bottom of the inside of a piling hole, and FIG. 4b is a longitudinal sectional front view showing a state where a penetration shaft is made to penetrate into the hole bottom, respectively.

FIGS. 5a to 5g are schematic longitudinal sectional views showing, in order of FIG. 5a to FIG. 5g, steps of the piling construction by a preboring method using the penetration testing device when a support strength of a hole bottom as a result of a penetration test is equal to or more than a prescribed value.

FIGS. 6a to 6f are schematic longitudinal sectional views showing, in order of FIG. 6a to FIG. 6f, steps after a penetration test when a support strength of a hole bottom as a result of the penetration test is less than the prescribed value.

FIGS. 7a to 7c show addition and connection of a steel pipe piling to a PHC piling to be used in the preboring method, and FIG. 7a is an exploded perspective view before the connection, FIG. 7b is a front view after the connection, and FIG. 7c is a longitudinal sectional view of a connected portion.

FIGS. 8a to 8k are schematic longitudinal sectional views showing, in order of FIG. 8a to FIG. 8k, steps of the piling construction by a kelly bar type earth drilling method using the penetration testing device when a support strength of a hole bottom as a result of a penetration test is equal to or more than the prescribed value.

FIGS. 9a to 9e are schematic longitudinal sectional views showing, in order of FIG. 9a to FIG. 9e, steps of the piling construction by the kelly bar type earth drilling method after the penetration test when the support strength of the hole bottom as a result of the penetration test is less than the prescribed value.

FIGS. 10a to 10h are schematic longitudinal sectional views showing, in order of FIG. 10a to FIG. 10h, steps of the piling construction by an all casing method using the penetration testing device when a support strength of a hole bottom as a result of a penetration test is equal to or more than the prescribed value.

FIGS. 11a to 11e are schematic longitudinal sectional views showing, in order of FIG. 11a to FIG. 11e, steps of the piling construction by the all casing method after the penetration test when the support strength of the hole bottom as a result of the penetration test is less than the prescribed value.

FIG. 12a is an overall side view, and FIG. 12b is a side view of an essential portion in a state where a penetration testing device of a digging rod connecting type is connected to a screw rod.

FIG. 13a is an overall side view, and FIG. 13b is a side view of an essential portion in a state where a penetration testing device of a digging rod connecting type is connected to a kelly bar.

FIGS. 14a to 14c show a tip end rod member of an earth auger screw rod in which a penetration testing device of a type incorporating a hollow rod is incorporated, and FIG. 14a is a longitudinal sectional side view at the time of digging, FIG. 14b is a longitudinal sectional side view at the time of preparation for a test, and FIG. 14c is a longitudinal sectional side view at the time of start of the test, respectively.

FIGS. 15a to 15g are schematic longitudinal sectional views showing, in order of FIG. 15a to FIG. 15g, steps of the piling construction by a preboring method using a penetration testing device of a type incorporating a hollow rod when a support strength of a hole bottom as a result of a penetration test is equal to or more than the prescribed value.

FIGS. 16a to 16f are schematic longitudinal sectional views showing, in order of FIG. 16a to FIG. 16f, steps of the piling construction by the preboring method when the support strength of the hole bottom as a result of the penetration test is less than the prescribed value.

DESCRIPTION OF EMBODIMENTS

Hereinafter, embodiments of a piling construction management method according to the present invention are described in detail with reference to the drawings. Components common in the respective embodiments are designated by the same reference sign.

Figure 1:
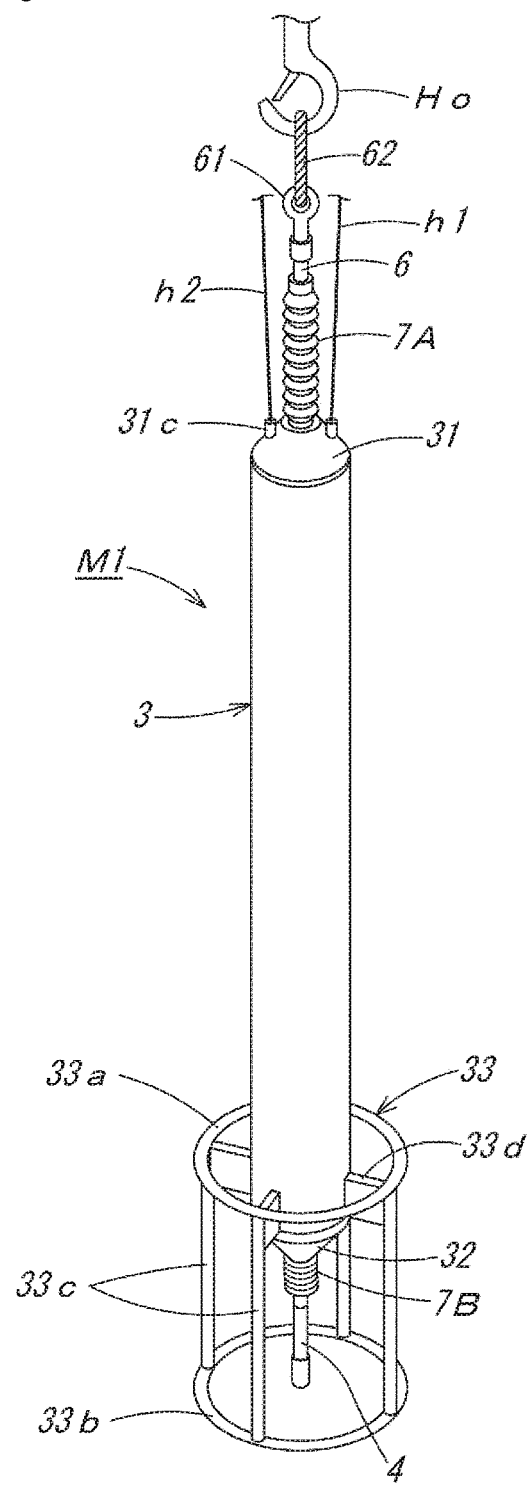
FIG. 1 is an overall perspective view showing an example of a penetration testing device of a suspended type to be used for a piling construction management method according to the present invention.

FIG. 1 to FIGS. 4 show a penetration testing device M1 of a suspended type as an example of a penetration testing device to be used in the piling construction management method according to the present invention. In this penetration testing device M1, as shown in FIG. 1 and FIG. 2, a cylindrical hammer casing 5 is loaded movably up and down inside a longitudinal cylindrical outer casing 3, and a rod-shaft-shaped suspending and supporting member 6 projects upward from an upper end side opening 31a provided in an upper tapered cap 31 of the outer casing 3, and a penetration shaft 4 projects downward from a lower end side opening 32a provided in a lower tapered cap 32 of the outer casing 3. In addition, between a nozzle portion 31b provided around the upper end side opening 31a of the upper tapered cap 31 and an upper portion of the suspending and supporting member 6, and between a nozzle portion 32b around the lower end side opening 32a and a middle portion of the penetration shaft 4, bellows cylinder bodies 7A and 7B that seal these upper end side opening 31a and lower end side opening 32a from the outside are respectively fitted. To a lower portion of the outer casing 3, a support leg 33 formed by connecting upper and lower pipe rings 33a and 33b with large diameters by a plurality (four in the drawing) of pipe struts 33c is fixedly provided via a bracket 33d disposed radially at an upper portion side such that the lower pipe ring 33b is positioned to be lower than a lower end of the outer casing 3.

In this piling hole penetration testing device M1, on a hook Ho suspended from a lower end of a wire (not shown in the drawing) hung down from a boom, etc., of a crawler crane, by hanging a hanging ring 62 formed of a wire and inserted through a hanging metal fitting 61 connected to an upper end of the suspending and supporting member 6, the entire testing device is suspended and let into and out of a piling hole H (refer to FIGS. 4), and on the other hand, when reaching the bottom of the piling hole H, the entire testing device is kept in an upright posture by the support leg 33.

The suspending and supporting member 6 has, as shown in FIG. 2(a), a lower end pivotally connected to the upper end of the hammer casing 5 via a pivot pin 63, and is provided with a circular flange-shaped stopper 60 at a middle portion positioned inside the outer casing 3 so as to support the outer casing 3 via the stopper 60 inside the upper tapered cap 31 when the outer casing 3 is suspended. In addition, setting is made such that, in this suspended state, a distal end of the penetration shaft 4 is positioned at the same level as or slightly higher than a lower end of the support leg 33, that is, the lower pipe ring 33b. As shown in FIG. 2(a) and FIG. 2(b), on an inner circumference of the outer casing 3, guide rails 33 formed of parallel two ridges along the up-down direction are disposed at a plurality of positions (in the drawing, four positions) in the circumferential direction at even intervals, and fitting keys 53 provided to project from upper and lower portions of an outer circumference of the hammer casing 5 fit the respective guide rails 33 slidably. The penetration shaft 4 is made of steel and has a cylindrical shaft shape having an opened distal end, and the distal end side is formed as a sampler 41 including a shoe and a split barrel (not shown in the drawing) capable of being two-split so as to be able to sample a geological sample.

Further, an attaching plate 34 is fixedly provided to an inner upper portion of the outer casing 3, and between a lower surface side of this attaching plate 34 and the upper end of the hammer casing 5, double-pipe type two telescopic pipings 81 and 81 constituting a supply and discharge channel of a hydraulic oil for a hydraulic cylinder 80 (refer to FIG. 3) described below inside the hammer casing 5 are interposed. In addition, to the lower surface side of the attaching plate 34, an encoder 9 that measures a lowering amount of the hammer casing 5 with respect to the outer casing 3 is attached, and a measurement cord 9a extending from the encoder 9 is fastened on the upper end of the hammer casing 5. Between the attaching plate 34 of the outer casing 3 and the upper tapered cap 31, hydraulic hoses h to be connected to upper end sides of the respective telescopic pipings 81, and an electric wiring e for an encoder 8, are disposed. It is noted that the upper tapered cap 31 is provided with cylinder shaft portions 31c for hose connection projecting upward on both sides of the upper end side opening 31a, and to both cylinder shaft portions 31c and 31c, hydraulic hoses h1 and h2 leading to an external hydraulic pressure supply source (not shown in the drawing) are connected via adapters a, and in one hydraulic hose h2, an electric wiring e for the encoder 9 is inserted between the double structure. At the center of the attaching plate 34, a through hole 34a is formed, and the suspending and supporting member 6 penetrates through this through hole 34a.

The upper and lower bellows cylinder bodies 7A and 7B are entirely formed into bellows shapes with the same diameter from a flexible material such as rubber or a semi-hard synthetic resin, and according to vertical movement of the hammer casing 5 inside the outer casing 3, while one of the bellows cylinder bodies 7A and 7B expands, in response to this, the other one contracts. Both of these bellows cylinder bodies 7A and 7B assume long and narrow cylinder shapes when they expand, and to prevent these from being crushed by a water pressure, a metal ring 71 to retain the shape is fitted therein for each fold (valley portion). Both end portions of these bellows cylinder bodies 7A and 7B are fastened in a liquid-tight manner to the nozzle portions 31b and 31b of the upper and lower tapered caps 31 and 32, the suspending and supporting member 6, and the penetration shaft 4 by fasteners 72 like fastening bands.

The hammer casing 5 has, as shown in FIG. 3, a lower end to which a knocking block 51 is fixed, and inside, incorporates a drive hammer 52 that strikes the knocking block 51 in free-fall, and a lifting mechanism 8 that lifts the drive hammer 51 after falling and releases the same at a prescribed height, and the penetration shaft 4 is fixed at a disk portion 4a at an upper end to a lower surface of the knocking block 51. At a center of an upper surface of the drive hammer 52, a lock shaft 52a with a top portion formed as a truncated conical portion 52b with a large diameter is implanted.

In the lifting mechanism 8, to a downward forked pivot frame 82 fixed to a distal end portion of an extendable rod 80a of the hydraulic cylinder 80, a pair of clamp arms 83 and 83 are pivotally attached swingably within vertical planes, and to a lower end outer circumferential portion of this hydraulic cylinder 80, a short cylindrical grasping releasing cylinder 84 that is opened downward and has an inner circumference lower portion formed as an annular tapered surface 84a expanded downward is fixed. Each clamp arm 83 includes an inward lock claw 83a at each lower end, and a sloping surface 83b sloping upward on an outer surface side of an upper end portion. Both the clamp arms 83 and 83 are biased in a closing direction in which their lock claws 83a and 83a approach each other by a coil spring 85 interposed between upper end portions facing each other of the clamp arms 83 and 83. It is noted that the two hydraulic hoses h and h led out from the hydraulic cylinder 80 of the lifting mechanism 8 are respectively connected to the telescopic pipings 81 on the upper sides.

In this lifting mechanism 8, when the drive hammer 52 is at a fallen position inside the hammer casing 5, by extending a piston rod 80a of the hydraulic cylinder 80, as shown in FIG. 3(a), the tapered surfaces 83b and 83b of the lock claws 83a and 83a of both the clamp arms 83 and 83 come into contact with the truncated conical portion 52b of the lock shaft 52a of the drive hammer 52, and by a slope guiding effect, both the clamp arms 83 and 83 open against biasing of the coil spring 85, and accordingly, both the lock claws 83a and 83a engage with a lower side of the truncated conical portion 52b. Then, in this engagement state, by retracting the piston rod 80a, the drive hammer 5 is grasped and lifted, and when the piston rod 80a reaches an upper limit position, as shown in FIG. 3(b), the sloping surfaces 83b and 83b of the upper end portion of both the clamp arms 83 and 83 come into contact with the tapered surface 84a of the grasping releasing cylinder 84, and by a slope guiding effect, both the clamp arms 83 and 83 are forcibly opened against biasing of the coil spring 85, therefore, the drive hammer 52 released from grasping freely falls and strikes the knocking block 51 at the bottom end of the hammer casing 5, and by this striking force, the hammer casing 5 moves down, and the penetration shaft 4 accordingly lowers.

Therefore, this penetration testing device M1 is suspended by a wire via a boom, etc., of a crawler crane, inserted into a piling hole H bored in the ground G and made to reach the bottom of the hole as shown in FIG. 4(a), and made to stand by itself by slacking the suspending wire, and accordingly, the hammer casing 2 inside the outer casing lowers due to its own weight, and the distal end of the penetration shaft 4 comes into contact with a hole bottom Hb. Then, in this state, by repeating striking by the drive hammer 52 by driving the penetration testing device M1, the penetration shaft 4 gradually penetrates into the ground at the hole bottom Hb as shown in FIG. 4(b), therefore, by measuring the number of impacts required for the penetration shaft 4 to penetrate to a prescribed depth from the hole bottom Hb, and, based on this number of impacts, whether or not a support strength of the ground at the hole bottom Hb is equal to or more than a prescribed value can be determined.

The number of impacts (N value) of the drive hammer 52 is counted by a hydraulic drive control device (not shown in the drawing) on the ground side which controls actuation of the hydraulic cylinder 80, and a penetration amount of the penetration shaft 4 into the hole bottom ground is measured as a lowering amount of the hammer casing 5 by the encoder 9. Then, a measurement signal output by the encoder 9 is transmitted to an automatic measurement device (not shown in the drawing) on the ground through the electric wiring e, and a sinkage amount, that is, a penetration amount of the penetration shaft 4 into the ground G per one strike and a cumulative penetration amount are recorded and displayed together with the number of impacts (N value). In a standard penetration test prescribed by JIS A 1219, a drive hammer with a mass of 63.5±0.5 kg is allowed to fall freely by 76±1 cm to strike a knocking block, and the number of impacts required for a penetration shaft with an outer diameter of 51±1 mm and an inner diameter of 35±1 mm to penetrate by 30 cm into the ground is expressed as an N value, therefore, in this penetration testing device M1 as well, in conformity with the standard penetration test described above, a standard strength may be grasped as an N value.

As a piling construction management method using the penetration testing device M1 of the suspended type described above, first, piling construction of a first embodiment by a preboring method is described in order of steps shown in FIG. 5 and FIG. 6. In this piling construction, FIG. 5(a): a screw rod Rs is attached to an auger machine A that moves up and down along a leader (not shown in the drawing) of a three-point pile driver, etc., and the screw rod Rs is lowered while being driven to rotate to dig the ground G, and FIG. 5(b): after a piling hole H1 with a depth reaching an estimated bearing stratum Gh of deep underground is formed, FIG. 5(c): while the screw rod Rs is pulled up, a foot protection liquid Ls such as soil cement is injected, and FIG. 5(d): subsequently, a hole circumference fixative solution Lf is injected up to an upper portion of the piling hole H, the screw rod Rs is pulled out, and then FIG. 5(e): the penetration testing device M1 suspended by a wire W of the three-point pile driver or another crane, etc., is inserted into the piling hole h1 and made to reach the hole bottom Hb1, and in a slack state of the wire W, a support strength of the piling bottom ground described above is measured. Then, when the support strength is equal to or more than a prescribed value, FIG. 5(f): a precast piling P such as a PHC piling or a PRC piling is attached to the auger machine A via a connecting rod Rj, and this precast piling P is inserted into the piling hole H1, and FIG. 5(g): embedded to the bottom of the piling hole H1, and accordingly, erection of the precast piling P is completed.

However, for example, as shown in FIG. 6(a), when the support strength of the piling bottom ground measured with the penetration testing device M1 is less than the prescribed value due to the fact that the bearing stratum Gh of deep underground is at a deeper position than an initial estimated position and the piling hole H1 does not reach the bearing stratum Gh, the piling hole H1 is dug again. That is, into the piling hole H1 from which the penetration testing device M1 has been pulled out, FIG. 6(b): the screw rod Rs is inserted again to dig, and accordingly, a deeper piling hole H2 is formed, and then the foot protection liquid Ls is additionally injected while the screw rod Rs is pulled up, FIG. 6(c): into the piling hole H2 after being dug again, the penetration testing device M1 suspended by the wire W is inserted again and made to reach the bottom, and in the same manner as described above, a support strength of a piling bottom ground is measured. Then, when the support strength is equal to or more than the prescribed value, this proves that the piling hole H2 has reached the bearing stratum Gh at a deeper position than the initial estimated position, therefore, FIG. 6(d): a precast piling P for the initial estimated piling hole H1 is used as a piling main body P1, and a precast piling PA obtained by adding and connecting a short piling member P2 to the piling main body P1 is used, FIG. 6(e): this precast piling PA is inserted in the same manner as described above into the piling hole H2 after being dug again, and FIG. 6(f): embedded to the bottom of the piling hole H2, and accordingly, erection of the precast piling PA is completed.

It is noted that, when the measured support strength of the piling bottom ground is still less than the prescribed value, even with the piling hole H2 after being dug again, re-digging and re-measurement may be repeated until the support strength reaches the prescribed value or more. However, this repetition is naturally limited in terms of cost and time, and normally, if the support strength is insufficient even after several times of re-digging and re-measurement, that place is to be judged as inappropriate for piling construction and the construction position is to be changed.

The precast piling PA to be inserted in the piling hole H2 after being dug again is formed to have a length corresponding to the piling hole H2 after being dug again by using the precast piling P corresponding to the initial estimated piling hole H1 as the piling main body P1 and adding a short piling member P2 to the piling main body P1 as described above, however, when the piling main body P1 is a concrete piling, for example, a PHC piling or a PRC piling, a steel pipe piling is easily added and connected as the short piling member P2. That is, in a concrete piling such as a PHC piling or a PRC piling, as shown in FIG. 7(a) to FIG. 7(c), to a lower end of a concrete cylinder body 11, a toric steel-made end plate 12 that comes into contact with an end face of the lower end and a steel-made reinforcing band 13 that encloses an outer circumferential surface are fixed, therefore, by using the steel-made end plate 12, a steel pipe piling can be easily added and connected to the concrete piling by welding or bolt fastening.

The steel pipe piling illustrated in FIG. 7 includes a steel pipe 20 having an upper end outer circumference to which a sag preventive ring 20a is fixed, a connecting ring member 21 that is fitted to an upper end of the steel pipe piling, and a bottom plate 22 that is fitted to a lower end of the steel pipe piling. The connecting ring member 21 includes a horizontal toric flange portion 21b fixed integrally to an upper end of a vertical toric ring portion 21a to be fitted into an upper end opening of the steel pipe 20, and in the flange portion 21b, bolt insertion holes 12a corresponding to respective screw holes 12a of the steel-made end plate 12 in the piling main body P1 are bored. To a lower end of a vertical toric ring portion 22a of the bottom plate 22, a horizontal toric flange portion 22b is fixed integrally. In this steel pipe piling, the flange portion 21b of the connecting ring member 21 is joined to the steel-made end plate 12 of the piling main body P1 and fixed via bolts 23, and after the upper end side of the steel pipe 20 is fitted onto the ring portion 21a of the connecting ring member 21, an outer circumferential side of the joined portion between the steel-made end plate 12 and the flange portion 21b of the connecting ring member 21 is welded, and then, an outer rim of the flange portion 21b and an upper end rim of the sag preventive ring 20a are welded to each other, and last, the bottom plate 22 is fitted and welded to the lower end opening of the steel pipe 20.

When the steel pipe 20 to be used for such a steel pipe piling is formed by carrying-in a long steel pipe material to a construction site in advance and cutting out a length corresponding to an increase in depth of the piling hole H2 caused by re-digging described above, the steel pipe 20 can respond to a difference in depth caused by re-digging. On the other hand, when the digging depth of re-digging is set to be uniform, and a plurality of steel pipes 20 with the same length corresponding to the digging depth are prepared in advance, swift response to the case where re-digging is required is possible. The steel pipe 20 is not limited to the illustrated simple cylindrical shape, and to improve resistance to pulling-out as a piling, various attachment forms such as a form with a spiral blade attached to an outer circumference thereof, and a form including annular flanges provided at prescribed intervals, etc., can be adopted.

Next, as a piling construction management method using the penetration testing device M1 of the suspended type described above, piling construction of a second embodiment by a kelly bar type earth drilling method is described in order of steps shown in FIG. 8 and FIG. 9. In this piling construction, FIG. 8(a): a weak stratum Gs at an upper level of the ground is dug and soil is removed by a shaft digging bucket B1 connected to a kelly bar K of an earth drill machine, FIG. 8(b): a standpipe Ps is press-fitted into the dug hole, FIG. 8(c): while injecting a slurry Ls such as a bentonite solution into the hole, digging and soil removal are performed by a replaced shaft digging bucket B2 with a small diameter, and accordingly, FIG. 8(d): a piling hole H1 with a depth reaching an estimated hard bearing stratum Gh of deep underground is formed. Then, FIG. 8(e): inside the piling hole H1 from which the shaft digging bucket B2 has been pulled out, a penetration testing device M1 suspended by a wire W by using a boom of the earth drill machine is inserted and made to reach the hole bottom Hb1, and in a slack state of the wire W, a support strength of the pile bottom ground described above is measured, and when the support strength is equal to or more than a prescribed value, FIG. 8(f): a reinforced frame F is erected inside the piling hole H1 from which the penetration testing device M1 has been pulled out, FIG. 8(g): a tremie pipe Tp is inserted to the inside of the reinforced frame F, FIG. 8(h): slime S is discharged by introduction of air A, and FIG. 8(i): while placing fresh concrete C, the tremie pipe Tp is pulled out along with the concrete placement, and FIG. 8(k): last, the standpipe Ps is pulled out, and accordingly, erection of a cast-in-place piling PB is completed.

Even in this construction method, for example, as shown in FIG. 9(a), when the measured support strength of the piling bottom ground is less than the prescribed value due to the fact that the bearing stratum Gh of deep underground is at a position deeper than an initial estimated position and the piling hole H1 does not reach the bearing stratum Gh, etc., the piling hole H1 is dug again. That is, into the piling hole H1 from which the penetration testing device M1 has been pulled out, FIG. 9(b): while additionally injecting the slurry Ls, by digging and removing soil with the shaft digging bucket B2 connected to the kelly bar K again, a deeper piling hole H2 is formed, and FIG. 9(c): into the piling hole H2 after being dug again, the penetration testing device M1 suspended by the wire W is inserted again and made to reach the hole bottom Hb2, and a support strength of the piling bottom ground is measured in the same manner as described above. Then, when the support strength is found to be equal to or more than the prescribed value due to the fact that the piling hole H2 has reached the bearing stratum Gh positioned deeper than the initial estimated position, etc., FIG. 9(d): a reinforced frame FC lengthened by using the reinforced frame F prepared for the initial estimated piling hole H1 as a reinforced frame main body F1 and adding and assembling a frame extension portion F2 to the reinforced frame main body F1, is used, and FIG. 9(e): the reinforced frame FC is erected in the piling hole H2 after being dug again, and thereafter, through the same process as in FIG. 8(g) to FIG. 8(k), erection of a cast-in-place piling PB is completed.

The reinforced frame FC to be erected in the piling hole H2 after being dug again is made to have a length corresponding to the piling hole H2 after being dug again by adding the frame extension portion F2 to the reinforced frame main body F1 that is the reinforced frame F corresponding to the initial estimated piling hole H1 as described above. For this addition, a method in which individual members including main reinforcements, hoop reinforcements, and reinforcing rings, etc., constituting a reinforced frame are fitted to the reinforced frame main body F1 at the piling construction site can be adopted, however, by adopting a method in which a short reinforced frame member formed into a frame form is prepared in advance, and this reinforced frame member is added and connected to the reinforced frame main body F1, the addition can be easily performed, therefore, swift response to the case where re-digging is required is possible. Further, by setting a digging depth of re-digging to be uniform and setting the frame extension portion F2 of the reinforced frame member to have a length corresponding to the digging depth in advance, further swift response to re-digging can be made.

Next, as a piling construction management method using the penetration testing device M1 of the suspended type described above, piling construction of a third embodiment by an all casing method is described in order of steps shown in FIG. 10 and FIG. 11. In this piling construction, FIG. 10(a): a tubing machine TM is disposed on the ground at a boring position, a steel-made casing tube CT suspended by a wire W of a crane is set in the tubing machine TM, FIG. 10(b): while the casing tube CT is pressed into the ground while being swung and/or rotated all around, the inside of the casing tube CT is dug and soil is removed by a hammer grab HG, FIG. 10(c): by adding casing tubes CT and continuing digging and soil removal, a piling hole H1 with a depth reaching an estimated bearing stratum Gh of deep underground is formed, and after hole bottom treatment is performed with the hammer grab HG or a sedimentation bucket (not shown in the drawing), FIG. 10(d): the penetration testing device M1 suspended by a wire W of a crane is inserted into the casing tubes CT and made to reach the hole bottom Hb1, and a support strength of the piling bottom ground described above is measured in a slack state of the wire W. Then, when the support strength is equal to or more than the prescribed value, FIG. 10(e): the reinforced frame F is erected inside the casing tubes CT from which the penetration testing device M1 has been pulled out, FIG. 10(f): a tremie pipe is inserted to the inside of the reinforced frame F, and FIG. 10(g): while fresh concrete C is placed, the casing tubes CT and the tremie pipe Tp are pulled out along with the concrete placement, and FIG. 10(h): finally, erection of a cast-in-place piling PB is completed.

Even in this construction method, for example, as shown in FIG. 11(a), when the measured support strength of the piling bottom ground is less than the prescribed value due to the fact that the bearing stratum Gh of deep underground is at a position deeper than the initial estimated position and the piling hole H1 does not reach the bearing stratum Gh, etc., the piling hole H1 is dug again. That is, in the piling hole H1 from which the penetration testing device M1 has been pulled out, FIG. 11(b): by adding the casing tubes CT and digging and removing soil by the hammer grab HG again, a deeper piling hole H2 is formed, FIG. 11(c): the penetration testing device M1 suspended by the wire W is inserted again into the piling hole H2 after being dug again and made to reach the hole bottom Hb2, and a support strength of the piling bottom ground is measured in the same manner as described above. Then, when the support strength is found to be equal to or more than the prescribed value due to the fact that the piling hole H2 has reached the bearing stratum Gh positioned deeper than an initial estimated position, etc., FIG. 11(d): a long reinforced frame FC formed by adding a frame extension portion F2 to a reinforced frame main body F1 that is the reinforced frame F for the piling hole H1 is used as in the case of the second embodiment described above, FIG. 11(e): the reinforced frame FC is erected in the piling hole H2 after being dug again, and thereafter, through the same process as in FIG. 10(f) to FIG. 10(h), erection of a cast-in-place piling PB is completed.

It is noted that, as a cast-in-place piling construction method, the kelly bar type earth drilling method of the second embodiment and the all casing method of the third embodiment described above are illustrated, however, the piling construction management method according to the present invention is also applicable to other cast-in-place piling construction methods using a reinforced frame, such as a reverse construction method and a caisson type pile method, etc. In addition, as a penetration testing device that measures a support strength of piling bottom ground, the penetration testing device M1 of the suspended type is illustrated in the first to third embodiments described above, however, other than this suspended type, there is a digging rod connecting type or a type incorporating a hollow rod of a digging member as described above, and penetration testing devices other than the suspended type can also be used in the piling construction management method of the present invention without problem.

In addition, even in the penetration testing devices of the digging rod connecting type or the type incorporating a hollow rod, the basic configuration which includes, inside a vertical cylindrical casing, a knocking block integrated with a penetration shaft that projects downward, a drive hammer that strikes the knocking block in free-fall, and a lifting mechanism that lifts the drive hammer after falling and releases the same at a prescribed height, and determines a support strength of a hole bottom from the number of impacts required for the penetration shaft made to reach the bottom of a piling hole to penetrate into the hole bottom to a prescribed depth, is the same as that of the illustrated suspended type. A penetration testing device M2 of a digging rod connecting type is illustrated in FIG. 12 and FIG. 13, and a penetration testing device M3 of a type incorporating a hollow rod is illustrated in FIG. 14, respectively.

Figure 12A:
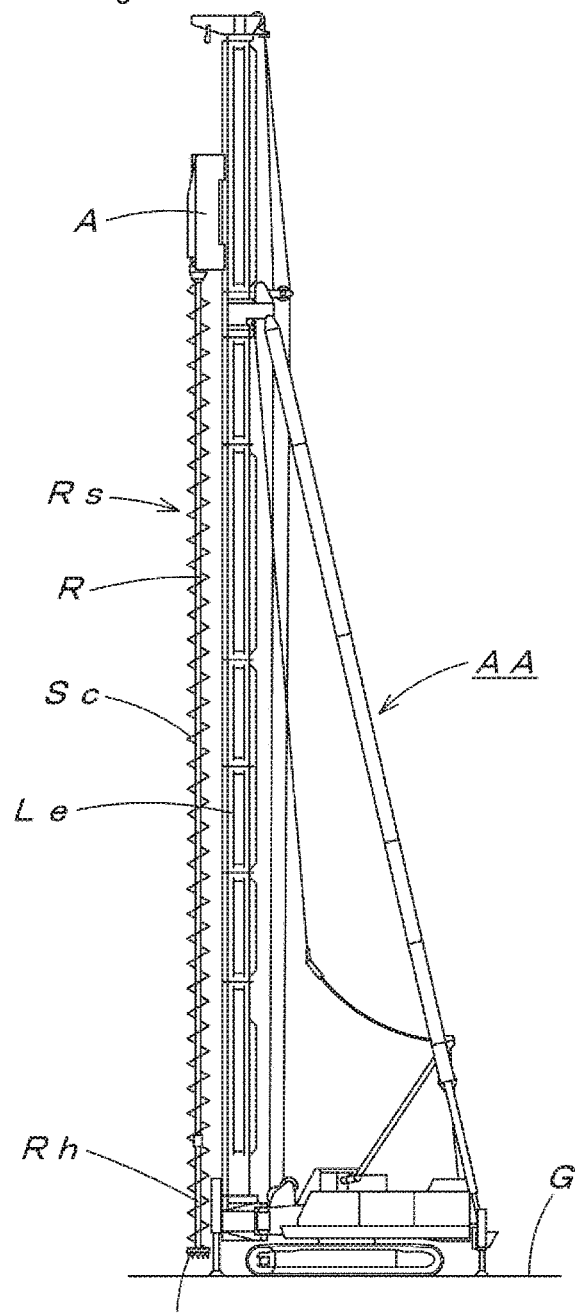
FIGS. 12a and 12b show an earth auger to be used for a preboring method.
Figure 12B:
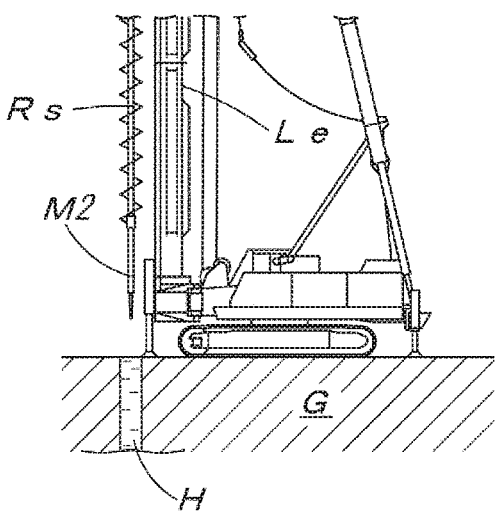

FIG. 12(a) shows an earth auger AA to be used in a preboring method. In this earth auger AA, an auger machine A is fitted movably up and down to a vertically-held leader Le of a three-point support type pile driver, and a screw rod Rs is held at an upper end portion by the auger machine A. This screw rod Rs has a spiral blade Sc formed around a linear hollow rod R across substantially the entire length thereof, and a distal end side thereof is formed of an independent short tip end rod member Rh having digging blades E on a lower end. Then, as shown in FIG. 12(b), after a piling hole H is formed in the ground G, to determine a support strength of a hole bottom thereof, in place of the tip end rod member Rh connected to the lower end of the screw rod Rs, the penetration testing device M2 of the digging rod connecting type is connected to the lower end of the screw rod Rs and used.

Figure 13A:
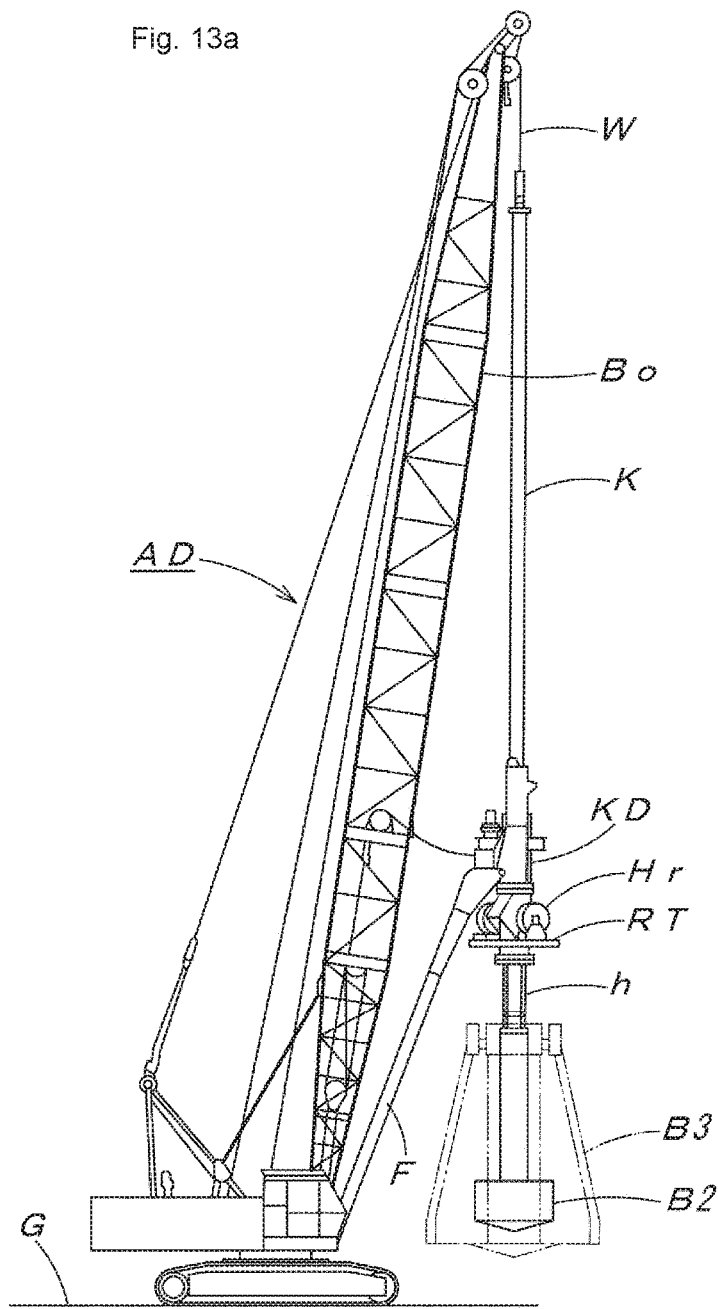
FIGS. 13a and 13b show a kelly bar type earth drill machine.
Figure 13B:
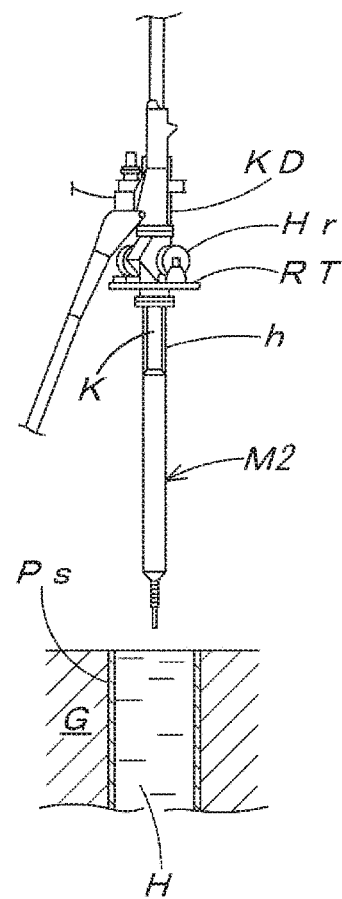

FIG. 13(a) shows an earth drill machine AD to be used in the kelly bar type earth drilling method. This earth drill machine AD consists of a traveling crane including a boom Bo and a front frame F, a kelly drive device KD is held on a distal end of the front frame F projecting diagonally forward, and a kelly bar K suspended by a boom Bo via a winding rope W is inserted movably up and down through the kelly drive device KD, and to a lower position of the kelly drive device KD, a rotary table RT on which a pair of hose reels Hr are mounted is attached, and this rotary table RT is provided with a rotary coupling (not shown in the drawing) for hydraulic pressure and electric wiring. To a lower end of the kelly bar K, a shaft digging bucket B2 shown by solid lines or a belling bucket B3 shown by imaginary lines are connected to dig a hole in the ground G and perform bottom-enlarging digging after digging the hole. Thus, as shown in FIG. 13(b), after a piling hole H is formed in the ground G, to determine a support strength of the hole bottom, in place of the shaft digging bucket B2 or the belling bucket B3 connected to the lower end of the kelly bar K, the penetration testing device M2 of the digging rod connecting type is connected to the lower end of the kelly bar K and used. It is noted that the reference sign Ps denotes a standpipe described in the piling construction of the second embodiment described above [refer to FIG. 8(c)].

The penetration testing device of a type incorporating a hollow rod of a digging member is incorporated inside the tip end rod member Rh being hollow of the screw rod Rs shown in FIG. 12(a) or incorporated inside a hollow shaft portion of the shaft digging bucket B2 or belling bucket B3 shown in FIG. 13(a). As a detailed example, a tip end rod member Rh of a screw rod Rs in which this penetration testing device is incorporated is shown in FIG. 14(a) to FIG. 14(c).

As shown in the drawing, the tip end rod member Rh incorporates the penetration testing device M3 inside a cylindrical hollow rod 100, and while a connecting convex block 110 is provided to project on an upper end plate 101 of the hollow rod 100, at a center of a lower end plate 102, an opening 103 in the shape of a circular hole is formed, and a movable sealing plate 104 that normally closes the opening 103 from the lower side by biasing of a spring not shown in the drawing is attached. In addition, to an outer circumference of the hollow rod 100, a spiral blade Sc is fixedly provided across the entire length, and a plurality of digging blades E are provided to project from a lower edge of the spiral blade Sc. On a lower end side of the hollow rod 100, a grout discharge opening 105 opened laterally is provided, and inside the hollow rod 100, a grout piping 120 leading from a central hole 110a of the connecting convex block 110 to the grout discharge opening 105 is provided.

The penetration testing device M3 is configured such that inside a cylindrical outer casing 3 disposed concentrically and fixed inside the hollow rod 100, a cylindrical hammer casing 5 is loaded movably up and down, and a penetration shaft 4 is hung down to project from a lower end of the hammer casing 5. Between the lower end of the hammer casing 5 and the opening 103 at the lower end of the hollow rod 100, an expandable bellows cylinder body 7C made of a flexible material such as rubber or a semihard synthetic resin is fitted in a manner of surrounding the penetration shaft 4. Inside the hammer casing 5, as in the case of the penetration testing device M1 of the suspended type described above, a knocking block 51, a drive hammer 52, and a lifting mechanism 8 (refer to FIG. 3) are provided although these are not shown in the drawing.

On an upper portion side inside the outer casing 3, a hydraulic cylinder 201 including an extendable rod 201 directed downward as a casing displacement means 200 is provided to hang, a lock shaft 203 whose lower end side is formed as a lock head portion 203a pointed in the shape of an inverted circular cone is fixed to a distal end of the extendable rod 201, and on the other hand, to an upper end of the hammer casing 5, four clamp arms 205 disposed at even intervals in the circumferential direction are pivotally attached so as to freely tilt inward and outward. To the side of the lock shaft 203 higher than the lock head portion 203a, a sensor ring 204 to confirm a position with respect to the clamp arms 205 is fitted movably up and down. On an upper end of each clamp arm 205, an inward lock claw 205a is formed, and the clamp arms 205 are biased together in a standing direction by a spring (not shown in the drawing). It is noted that, as in the case of the penetration testing device M1 of the suspended type described above, an encoder [refer to FIG. 2(a)] that measures a lowering amount of the hammer casing 5 is attached to an upper portion side inside the outer casing 3 although this is not shown in the drawing.

Thus, in the screw rod RS incorporating the penetration testing device M3 in the tip end rod member Rh, during non-use of the penetration testing device M3, as shown in FIG. 14(a), the extendable rod 201 of the hydraulic cylinder 201 retracts in a state where the clamp arms 205 engage with the lock head portion 203, and accordingly, the hammer casing 5 is held at an upper standby position inside the outer casing 3, and the penetration shaft 4 is stored inside the hollow rod 100, and accordingly, the opening 103 at the lower end of the hollow rod 100 is closed by the movable sealing plate 104. Therefore, in the course of digging by the screw rod RS, there is no concern that the penetration shaft 4 comes into contact with the ground or a crushed object and is damaged, and mud and sand, sand gravel, and muddy water, etc., resulting from digging do not enter the inside of the outer casing 3.

On the other hand, when measurement by the penetration testing device M3 is performed after forming a piling hole, as shown in FIG. 14(b), first, by extending the piston rod 201a of the hydraulic cylinder 201, by the lock head portion 203a of the lock shaft 203, the respective clamp arms 205 are pushed and opened outward against biasing of the spring force, and further, the hammer casing 5 held at the upper standby position is pressed and moved down. According to this downward movement of the hammer casing 5, the penetration shaft 4 pushes and opens the movable sealing plate 104 and projects downward from the opening 103, and accordingly, as shown in FIG. 14(c), by rapidly retracting the piston rod 201a of the hydraulic cylinder 201, the lock head portion 203 is separated upward from the clamp arms 25, and therefore, the hammer casing 5 that is thus unlocked lowers due to its own weight until the distal end of the penetration shaft 4 reaches the hole bottom. Therefore, in this bottom reaching state, by driving the penetration testing device M3, whether or not a support strength of the ground at the hole bottom is equal to or more than the prescribed value can be determined in the same manner as in the penetration testing device M1 of the suspended type.

Then, when the penetration test is finished, by extending the piston rod 201a of the hydraulic cylinder 201, the lock head portion 203a of the lock shaft 203 is inserted between the clamp arms 205, the lock claws 205a of the respective clamp arms 205 are engaged with the lock head portion 203a, and in this lock state, by actuating and retracting the hydraulic cylinder 201, the hammer casing 5 can be lifted to and held at the upper standby position.

A piling construction management method in the preboring method using this penetration testing device M3 of the type incorporating a hollow rod is described in order of steps shown in FIG. 15 and FIG. 16. In this piling construction, FIG. 15(a): a screw rod Rs is attached to an auger machine A that moves up and down along a leader Le [refer to FIG. 12(a)] of a three-point pile driver, etc., and by digging the ground G by lowering this screw rod Rs while driving and rotating the same, FIG. 15(b): a piling hole h1 with a depth reaching an estimated bearing stratum Gh of deep underground is formed, and then, FIG. 15(c), the screw rod Rs is slightly pulled up to separate the digging blades E from the bottom, and in this state, the penetration shaft 4 of the penetration testing device M3 incorporated inside the tip end rod member Rh is made to project downward and reach the hole bottom Hb1, and a support strength of the piling bottom ground is measured as described above. Then, when the support strength is equal to or more than the prescribed value, FIG. 15(d): a foot protection liquid Ls such as soil cement is injected while the screw rod Rs is pulled up, and FIG. 15(e): subsequently, a hole circumference fixative solution Lf is injected up to an upper portion of the piling hole H, the screw rod Rs is pulled out, and then FIG. 15(f): a precast piling P such as a PHC piling or a PRC piling is attached to the auger machine A via a connecting rod Rj, this precast piling P is inserted into the piling hole H1, and FIG. 15(g): embedded to the bottom of the piling hole H1, and accordingly, erection of the precast piling P is completed.

However, for example, as shown in FIG. 16(a), when the support strength of the piling bottom ground measured with the penetration testing device M3 is less than the prescribed value due to the fact that the bearing stratum Gh of deep underground is at a position deeper than an initial estimated position and the piling hole H1 does not reach the bearing stratum Gh, etc., the piling hole H1 is dug again. That is, the screw rod Rs left inserted in the piling hole H1 after the penetration test is used as it is, and after the penetration shaft 4 of the penetration testing device M3 is retreated, FIG. 16(b): by digging the piling hole H1 again, a deeper piling hole H2 is formed, and then FIG. 16(c): in a state where the screw rod Rs is slightly pulled up and the digging blades E are separated from the bottom, the penetration shaft 4 of the penetration testing device M3 is made to reach a hole bottom Hb2 and a support strength of the piling bottom ground is measured again in the same manner as in the previous measurement. Then, when the support strength is found to be equal to or more than the prescribed value due to the fact that the piling hole H2 has reached the bearing stratum Gh positioned deeper than the initial estimated position, etc., after a foot protection liquid Ls and a hole circumference fixative solution Lf are injected while the screw rod Rs is pulled up, FIG. 16(d): a precast piling P for the initial estimated piling hole H1 is used as a piling main body P1, and a precast piling PA formed by adding and connecting a short piling member P2 to the piling main body P1 is used, FIG. 16(e): this precast piling PA is inserted in the piling hole H2 after being dug again, and FIG. 16(f): embedded to the bottom of the piling hole H2, and accordingly, erection of the precast piling PA is completed. The precast piling PA formed by adding and connecting the short piling member P2 to the piling main body P1 is the same as that described in the first embodiment described above.

As described above, according to the piling construction management method of the present invention, after a piling hole H1 with a set depth is formed in the ground G, before erecting a piling inside the piling hole H1, a support strength of a hole bottom Hb1 can be very easily and reliably measured with the penetration testing device M1, M2, or M3 disposed inside the piling hole H1, therefore, when the support strength is equal to or more than a prescribed value, erection is determined to be possible, and piling construction can be efficiently completed by erecting a piling in the piling hole H. On the other hand, when the support strength is less than the prescribed value, erection is determined to be impossible, however, there is no need to form a new piling hole at a different place, and it is possible to respond by digging the same hole H1 again and performing determination again, therefore, a change in design of a building, a significant increase in construction cost, and extension of construction period can be avoided, and in addition, a precast piling P prepared in advance for the piling hole H1 with a set depth and a reinforced frame F for a cast-in-place piling can be utilized as a piling main body P1 and a reinforced frame main body F1 by simply adding lengths as shortfalls thereto, therefore the material cost can be prevented from increasing, and a piling erecting work can be efficiently performed. In addition, it is also possible that by making a digging depth of re-digging correspond to the length of the short piling member P2 or the frame extension portion F2 to be added, uniform piling construction management using short piling members P2 or frame extension portions F2 that have the same dimensions and shape is performed.

The invention claimed is:

1. A piling construction management method, comprising:
    providing a penetration testing device including a knocking block integrated with a penetration shaft projecting downward, a drive hammer that strikes the knocking block in free-fall, and a lifting mechanism that lifts the drive hammer after falling and releases the drive hammer at a prescribed height;
    wherein the penetration testing device is configured such that a cylindrical hammer casing incorporating the lifting mechanism and the drive hammer is held movably up and down inside a vertical cylindrical outer casing, the knocking block is fixed to a lower end of the hammer casing, and the penetration shaft penetrates through a lower end side of the outer casing and projects downward to an outside of the outer casing;
    after forming a piling hole with a set depth in the ground and before erecting a piling in the piling hole, disposing the penetration shaft of the penetration testing device inside the piling hole such that the penetration shaft reaches a hole bottom, and determining a support strength of the hole bottom based on the required number of impacts by the drive hammer for the penetration shaft to penetrate to a prescribed depth from the hole bottom;
    when the support strength is equal to or more than a prescribed value, erecting a piling in the piling hole; and
    when the support strength is less than the prescribed value, digging the piling hole deeper to form a deeper hole bottom and determining a support strength of the deeper hole bottom based on the required number of impacts by the drive hammer for the penetration shaft to penetrate to a prescribed depth from the deeper hole bottom until the support strength of the deeper hole bottom reaches the prescribed value or more, and erecting a piling in the piling hole with a length corresponding to a depth of the deeper piling hole.

2. The piling construction management method according to claim 1, wherein the penetration testing device incorporates an encoder that measures a sinkage amount of the hammer casing.

3. The piling construction management method according to claim 1, further comprising suspending the penetration testing device by a wire of a crane and letting the penetration device into and out of the piling hole.

4. The piling construction management method according to claim 1, further comprising removing a digging tip member after digging the piling hole and connecting the penetration testing device in place of the digging tip member, and letting the penetration testing device into and out of the piling hole.

5. The piling construction management method according to claim 1, further comprising completing the determination of the support strength by activating the penetration testing device after the piling hole has been dug and in a state where a digging tip member is inserted in the piling hole.

6. The piling construction management method according to claim 1, wherein the piling is a precast piling, and when the method requires erecting the piling in the piling hole that has been dug deeper, the erecting the piling comprises providing a piling main body with a length corresponding to the length of the piling hole that was formed first and connecting the piling main body to a shorter piling member with a length corresponding to the length of the increase in depth caused by digging the piling hole deeper.

7. The piling construction management method according to claim 6, wherein the piling main body is a concrete piling, and the shorter piling member is a steel pipe piling connected to a lower end of the concrete piling.

8. The piling construction management method according to claim 1, wherein the piling is a cast-in-place piling with a reinforced frame, and when the method requires erecting the piling in the piling hole that has been dug deeper, the erecting the piling comprises providing a reinforced frame main body with a length corresponding to the length of the piling hole that was formed first and connecting the reinforced frame main body to a reinforced frame extension portion with a length corresponding to the length of the increase in depth caused by digging the piling hole deeper, inserting the reinforced frame main body and reinforced frame extension portion into the piling hole, and placing fresh concrete in the piling hole to form the cast-in-place piling.

\* \* \* \* \*